United States Patent
Takemoto et al.

[19]

[11] Patent Number: 6,116,705
[45] Date of Patent: Sep. 12, 2000

[54] ANTI-SKID CONTROL SYSTEM

[75] Inventors: Shinya Takemoto, Chiryu; Yuzo Imoto, Chita-gun, both of Japan

[73] Assignee: DENSO Corporation, Kariya, Japan

[21] Appl. No.: 09/107,512

[22] Filed: Jun. 30, 1998

[30] Foreign Application Priority Data

Jun. 30, 1997 [JP] Japan .................................. 9-174872
Aug. 28, 1997 [JP] Japan .................................. 9-233022

[51] Int. Cl.$^7$ ...................................................... B60T 8/66
[52] U.S. Cl. ................... 303/158; 303/113.1; 303/113.2; 303/157; 303/113.3; 303/114.1
[58] Field of Search ............................. 303/113.1, 113.2, 303/115.3, 115.2, DIG. 2, 157, 158, 113.3, 113.4, 113.5, 114.1, 114.2, 114.3, 115.1

[56] References Cited

U.S. PATENT DOCUMENTS

| | | | |
|---|---|---|---|
| 4,865,399 | 9/1989 | Atkins et al. | 303/113.2 |
| 5,297,861 | 3/1994 | Morita et al. | 303/113.5 |
| 5,340,204 | 8/1994 | Okazaki et al. | 303/113.2 |
| 5,407,257 | 4/1995 | Iwata | 303/113.2 |
| 5,458,405 | 10/1995 | Watanabe | 303/113.1 |
| 5,518,307 | 5/1996 | Okazaki | 303/157 |

FOREIGN PATENT DOCUMENTS 5-069808  3/1993  Japan .
5-162626  6/1993  Japan .

*Primary Examiner*—Robert J. Oberleitner
*Assistant Examiner*—Devon Kramer
*Attorney, Agent, or Firm*—Pillsbury Madison & Sutro LLP

[57] ABSTRACT

An anti-skid control system has a determining device which determines whether no pressure increasing output is scheduled to be generated for any of pressure increasing valves provided for plural wheels for at least a predetermined time period. When no pressure increasing output is scheduled to be generated for any of the pressure increasing valves for at least the predetermined time period, the pressure increasing valves are controlled so that a pressure increasing operation is carried out for at least one wheel cylinder to allow brake fluid to flow from a master cylinder to the wheel cylinder.

25 Claims, 12 Drawing Sheets

FIG.12
(a) SPEED
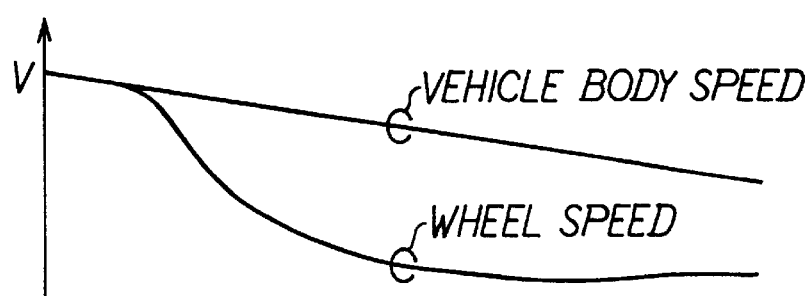
(b) PRESSURE INCREASING VALVE
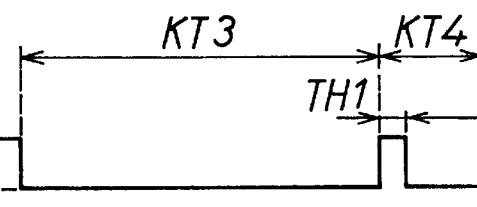
(c) PRESSURE DECREASING VALVE
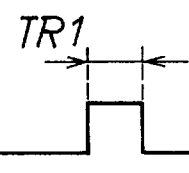
(d) W/C PRESSURE
(e) OPERATION AMOUNT OF BRAKE PEDAL
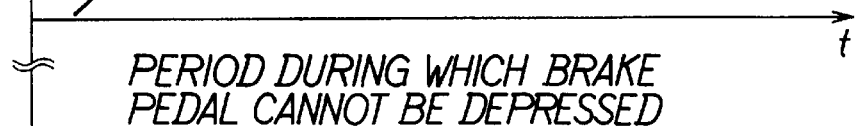
(f) OPERATION AMOUNT OF BRAKE PEDAL
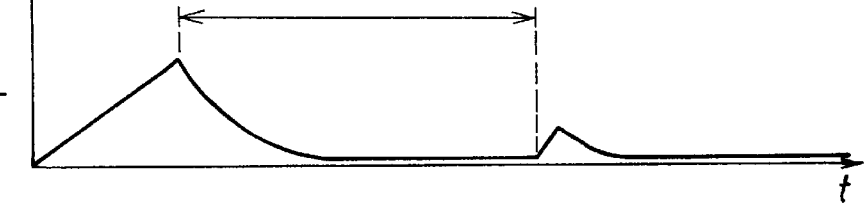

ANTI-SKID CONTROL SYSTEM

CROSS REFERENCE TO RELATED APPLICATION

This application is based upon and claims priority from Japanese Patent Applications No. Hei.9-174872 filed Jun. 30, 1997 and No. Hei.9-233022 filed Aug. 28, 1997, the contents of which are incorporated herein by reference.

BACKGROUND OF THE INVENTION

1. Field of the Invention

The present invention relates to an antiskid control system which controls slippage of wheels occuring at the time of vehicle braking.

2. Related Art

A conventional anti-skid control system calculates a slip ratio with respect to each of wheels from a vehicle body speed and each wheel speed and maintains a slipping state of each of the wheels in a reasonable state to prevent the wheels from locking.

The anti-skid control system has a master cylinder generating a brake fluid pressure in response to an operation of a brake pedal conducted by a driver and a plurality of wheel cylinders for producing a braking torque to each of the wheels using the brake fluid pressure generated by the master cylinder. The anti-skid control system controls a slipping state of each of the wheels by increasing or decreasing a brake fluid pressure of each of the wheel cylinders (hereinafter, referred to as W/C pressure).

In more detail, when the slip ratio of a wheel becomes large and the wheel has a tendency lock, the W/C pressure of the wheel is decreased by discharging the brake fluid within the wheel cylinder assigned to that wheel into a reservoir. When the tendency of the wheel to lock becomes small due to the decrease of the W/C pressure, the W/C pressure thereof is maintained. Also, when the tendency of the wheel to lock disappears, the W/C pressure thereof is increased at predetermined timing.

In the above-mentioned system, since the W/C pressure is increased using brake fluid pressure generated by the master cylinder, when the W/C pressure is to be maintained, the brake fluid pressure generated by the master cylinder is prevented from being transmitted to the wheel cylinder. At this time, however, the movement of the brake pedal is restricted because the brake fluid pressure is not transmitted from the master cylinder to the wheel cylinder. When the restriction of the brake pedal movement lasts for a long time, the driver harbors a feeling such that the brake pedal cannot be depressed, that is, the brake pedal is like a fixed plate (hereinafter, referred to as "fixed plate feeling"). As a result, an operational feeling of the brake pedal deteriorates.

SUMMARY OF THE INVENTION

The present invention is made in view of the above problem and its object is to provide an anti-skid control system which can provide a good operational feeling of a brake pedal to a driver by adjusting a period of time during which a movement of the brake pedal is restricted.

To attain the above-described object, the inventors of the present invention studied a control method of an anti-skid control system.

In the anti-skid control system, pressure increasing timing is established independently for each of the wheels, and the W/C pressure of each of the wheels is increased in accordance with the pressure increasing timing. FIG. 7 shows pressure increasing timing during a pressure increasing control mode and an operation amount of the brake pedal. It is to be noted that a time chart (a) shows pressure increasing timing in a first wheel, a time chart (b) shows pressure increasing timing in a second wheel, a time chart (c) shows an operation amount of a brake pedal in a so-called pump-less system in which the brake fluid discharged in a reservoir is returned to a master cylinder without using a pump, a time chart (d) shows an operation amount of a brake pedal in a system provided with a pump in which the brake fluid discharged in a reservoir is returned to a master cylinder using a pump.

As shown in FIG. 7, a pressure increasing output is intermittently generated as a pressure increasing pulse signal at each of the pressure increasing timing. That is, the W/C pressure is actually increased at pressure increasing timing and the W/C pressure is maintained other than that timing even during the pressure increasing control mode.

As described above, the movement (stroke) of the brake pedal is restricted when the W/C pressure is maintained. Therefore, if pressure increasing timing does not come for both the first and second wheels over a long time, a driver receives the fixed plate feeling from the brake pedal and an operation feeling thereof becomes worse.

Therefore, an anti-skid control system according to the first aspect of the present invention includes an anti-skid control performing device provided with a determining device which determines whether no pressure increasing output is scheduled to be generated for any of plural wheels for at least a predetermined time period. When the determining device determines that no pressure increasing output is scheduled to be generated for any of the plural wheels for at least the predetermined time period, the anti-skid control performing device controls brake fluid pressure adjusting valves so that a pressure increasing operation is carried out with respect to at least one wheel within the predetermined time period.

In this way, by carrying out the pressure increasing operation with respect to at least one wheel within the predetermined time period after which the driver may harbor the fixed plate feeling from the operation of a brake pedal, the driver can depress the brake pedal, thereby receiving no fixed plate feeling therefrom. As a result, it is possible to provide an anti-skid control system having a good operational feeling of the brake pedal.

The anti-skid control performing device can carry out the pressure increasing operation within the predetermined time period by advancing pressure increasing output generation timing which has been set for at least one wheel of the plural wheels prior to the determination of the determining device.

The anti-skid control performing device can also carry out the pressure increasing operation by generating a pressure increasing output for at least one wheel, irrespective of pressure increasing output generation timing which has been set for the plural wheels prior to the determination of the determining device.

Preferably, the anti-skid control performing device selects, among the plural wheels, one wheel in which the longest time has elapsed from the previous pressure increasing output and carries out the pressure increasing operation to a wheel cylinder assigned to the selected wheel. It is conceivable that the wheel in which the longest time has elapsed from the previous pressure increasing output has a margin for pressure increasing because the W/C pressure thereof is relatively low. Therefore, by carrying out the pressure increasing operation to such a wheel, is the fixed plate feeling is not given to the driver through the operation of the brake pedal, but also anti-skid control can be favorably carried out.

Alternatively, the anti-skid control performing device can select a wheel which has the lowest slip ratio as the wheel for the pressure increasing operation to be carried out. As a result, it is possible to prevent the slip ratio of the wheel from being excessively large due to the pressure increasing operation. Also, the anti-skid control performing device can select a wheel in which the sum of pressure increasing output generation time periods is the smallest after a previous pressure decreasing output is generated. That is, it is conceivable that the wheel in which the sum of pressure increasing output generation time periods is the smallest has a lower W/C pressure than the other wheels. Therefore, even when the pressure increasing operation is carried out to the selected wheel, it is possible to prevent the slip ratio of the wheel from being excessively large due to the pressure increasing operation.

When each of the W/C pressures can be directly or indirectly detected, as the wheel for the pressure increasing operation to be carried out, the wheel having the smallest W/C pressure may be selected.

Next, an anti-skid control system according to the second aspect of the present invention is explained.

In the anti-skid control system, anti-skid control is performed by independently increasing, decreasing, or maintaining W/C pressures of plural wheels in response to a slipping state of each of the wheels.

FIG. 13 shows time charts of anti-skid control being performed and an operation amount of a brake pedal. It is to be noted that a time chart (a) shows a vehicle body speed and a wheel speed, a time chart (b) shows opening and closing timing of a pressure increasing valve, a time chart (c) shows opening and closing timing of a pressure decreasing valve, a time chart (d) shows the W/C pressure, a time chart (e) shows an operation amount of a brake pedal in a so-called pump-less system in which the brake fluid discharged in a reservoir is returned to a master cylinder without using a pump, and a time chart (f) shows an operation amount of a brake pedal in a system provided with a pump in which the brake fluid discharged in a reservoir is returned to a master cylinder using a pump.

As shown in FIG. 13, when anti-skid control starts, pressure decreasing control and pressure maintaining control are sequentially carried out. Therefore, during that time, because the pressure increasing valve is continuously closed, a brake fluid pressure generated by the master cylinder is not transmitted to a wheel cylinder corresponding to the closed pressure increasing valve.

The movement of the brake pedal is restricted when all the pressure increasing valves are closed. If all the pressure increasing valves continue to be closed over a long time, a driver receives the fixed plate feeling from the brake pedal and an operation feeling thereof becomes worse.

Therefore, an anti-skid control system according to the second aspect of the present invention includes an anti-skid control performing device provided with a first determining device which determines whether brake fluid flow is prohibited in every conduit connecting a master cylinder to plural wheel cylinders of plural wheels for at least a first predetermined time. When the brake fluid flow is prohibited in all the conduits for at least the first predetermined time, the anti-skid control performing device selects at least one wheel from the plural wheels and drives a pressure increasing valve corresponding to a wheel cylinder of the selected wheel into an opening state. As a result, the brake fluid flow is allowed between the master cylinder and the wheel cylinder.

The first predetermined time is set to be shorter than a time period wherein, if the pressure increasing valve is continuously closed for that time period, the driver would receive the fixed plate feeling from a brake pedal. Therefore, if the brake fluid flow is allowed between the master cylinder and the wheel cylinder by the pressure increasing valve when the brake fluid flow is prohibited in all the conduits for at least the first predetermined time, the driver can depress the brake pedal prior to receiving the fixed plate feeling from the brake pedal. Therefore, it is possible to provide an anti-skid control system having a good operational feeling of a brake pedal.

When the time period after which the driver certainly receives the fixed plate feeling is a time that both a first predetermined time and a second predetermined time elapse, if any one of the pressure increasing valves is opened before the second predetermined time elapses, the driver will not receive the fixed plate feeling from the brake pedal. Therefore, the anti-skid control system may further comprise a second determining device which determines whether brake fluid flow is going to be allowed in any one of the plural conduits within the second predetermined time. When the determining device determines that brake fluid flow is not going to be allowed in all the conduits within the second predetermined time, at least one wheel is selected and a pressure increasing valve corresponding to a wheel cylinder of the selected wheel is opened.

The time period during which the pressure increasing valve is opened may be varied in accordance with a W/C pressure of a wheel cylinder of the selected wheel. If the pressure increasing valve is opened for a long time when, for example, the W/C pressure is maintained at a desired pressure in the wheel cylinder of the selected wheel, the W/C pressure of the wheel cylinder is excessively increased. Therefore, it is preferable to vary the time period during which the pressure increasing valve is opened in accordance with the W/C pressure of the selected wheel.

The anti-skid control performing device may open a pressure decreasing valve corresponding to the wheel cylinder of the selected wheel, in addition to the pressure increasing valve switched in an open state. As a result, not only brake fluid flow is allowed between the master cylinder and the wheel cylinder, but also brake fluid flow is allowed between the wheel cylinder and a reservoir connected on a downstream side of the pressure decreasing valve. In this case, even if the pressure increasing valve is opened, the W/C pressure of the selected wheel is not increased excessively.

Preferably, the anti-skid control performing device selects, among the plural wheels, one wheel in which the longest time has elapsed from the previous pressure increasing operation and opens the pressure increasing valve corresponding to the selected wheel. It is conceivable that the wheel in which the longest time has elapsed from the previous pressure increasing operation has a margin for pressure increasing because the W/C pressure thereof is relatively low. Therefore, by selecting such a wheel, not only the fixed plate feeling is not given to the driver from the operation of the brake pedal, but also anti-skid control can be favorably carried out.

Alternatively, the anti-skid control performing device can select a wheel which has the lowest slip ratio. As a result, it is possible to prevent the slip ratio of the wheel from being excessively large when the pressure increasing valve is opened. Also, the anti-skid control performing device can select a wheel in which the sum of pressure increasing output generation time periods after a pressure decreasing output earlier generated is the smallest. That is, it is conceivable that the wheel in which the sum of pressure increasing output generation time periods is the smallest has a lower W/C pressure than the other wheels. Therefore, even when the pressure increasing valve is opened, it is possible to prevent the slip ratio of the wheel from being excessively large.

When each of the W/C pressures can be directly or indirectly detected, as the wheel for the corresponding pressure increasing valve to be opened, the wheel having the smallest W/C pressure may be selected.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 12 is time charts for explaining functions of the anti-skid control system according to the second embodiment.

PREFERRED EMBODIMENTS OF THE INVENTION (First Embodiment)

Figure 1:
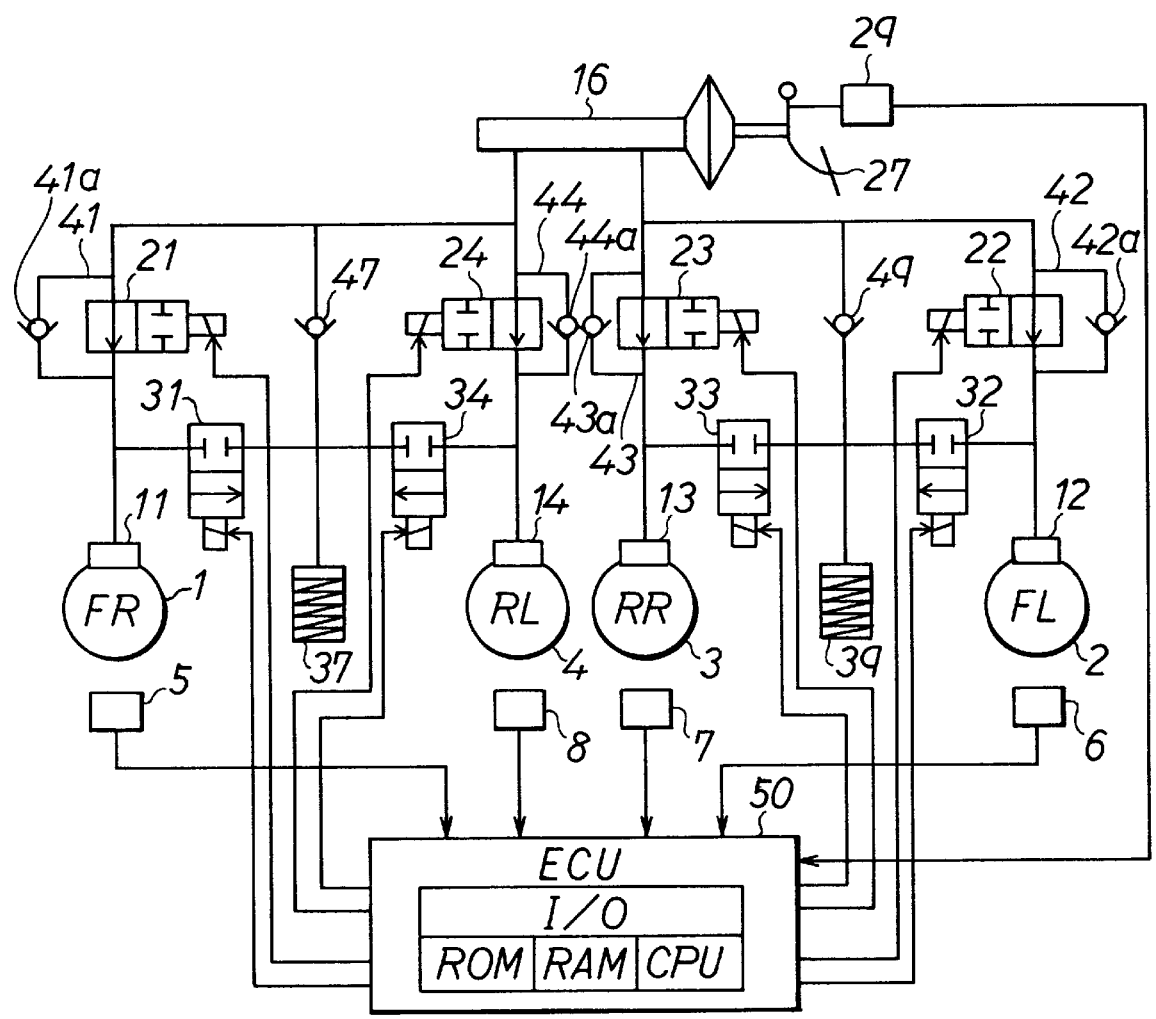
FIG. 1 is a schematic view illustrating an anti-skid control system according to a first embodiment of the present invention.

As shown in FIG. 1, wheel speed sensors 5–8 of electromagnetic pick-up type or magnetoresistance effect element type are disposed at a front-right wheel 1, a front left wheel 2, a rear-right wheel 3, and a rear-left wheel 4, respectively. The wheel speed sensors 5–8 generate pulse signals corresponding to rotations of the wheels 1–4.

Also, wheel cylinders 11–14 are provided to the wheels 1–4, respectively. Brake fluid pressure generated by a master cylinder 16 is transmitted to the wheel cylinders 11–14 via two position valves (pressure increasing control valve) 21–24 and the hydraulic conduits, respectively. The master cylinder 16 generates the brake fluid pressure in response to a brake pedal 27 depressed by a driver. A depression state of the brake pedal 27 is detected by a stop switch 29.

The wheel cylinders 11, 14 are connected to a reservoir 37 via two position valves (pressure decreasing control valves) 31, 34, respectively. The wheel cylinders 12, 13 are connected to a reservoir 39 via two position valves (pressure decreasing control valves) 32, 33, respectively.

It is to be noted that each of the two position valves 21–24, 31–34 are an electromagnetic type two position valve having an open position and a closed position.

Bypass passages 41–44 are provided across the two position valves 21–24, respectively. Check valves 41a–44a are disposed in the respective bypass passages 41–44, whereby only the brake fluid flowing from wheel cylinders 11–14 to the master cylinder 16 can pass through the bypass passages 41–44. Also, the master cylinder 16 is connected to the reservoirs 37, 39 via hydraulic conduits having check valves 47, 49, respectively. Therefore, only the brake fluid flowing from the reservoirs 37, 39 to the master cylinder 16 can pass through the hydraulic conduits having the check valves 47, 49. It is to be noted that, when pumps are used to return the brake fluid accumulated in the reservoirs 37, 39 to a master cylinder side, the pumps are disposed at the positions of the check valves 47, 49.

Detection signals of the wheel speed sensors 5–8 and the stop switch 29 are fed to an electronic control unit (ECU) 50. The ECU 50 is a well-know micro-computer having a CPU, a ROM, a RAM and an input/output circuit (I/O). The ECU 50 produces control signals to control the two position valves 21–24, 31–34 based on the detection signals. The control signals include three types of output modes (a pressure increasing output, a pressure maintaining output, and a pressure decreasing output), and are produced for each of the wheels 1–4. Here, actions of the two position valves 21–24, 31–34 caused by the respective outputs are explained using the case of the front right wheel 1 as an example.

Producing the pressure increasing output for the front-right wheel 1 means that the control signals are applied to the two position valves 21, 31 so that the two position valve 21 is switched to the open position and the two position valve 31 is switched to the closed position. As a result, the brake fluid pressure generated by the master cylinder 16 is supplied to the wheel cylinder 11 of the front-right wheel 1 as it is.

Producing the pressure maintaining output for the front-right wheel 1 means that the control signals are applied to the two position valves 21, 31 so that both of the two position valves 21, 31 are switched to the closed position. As a result, the brake fluid pressure of the wheel cylinder 11 is maintained. If the depression of the brake pedal 27 is reduced during the pressure maintaining output being produced, the brake fluid flows through the bypass passage 41 and the brake fluid pressure of the wheel cylinder 11 is decreased.

Producing the pressure decreasing output for the front-right wheel 1 means that the control signals are applied to the two position valves 21, 31 so that the two position valve 21 is switched to the closed position and the two position valve 31 is switched to the open position. As a result, the brake fluid of the wheel cylinder 11 is discharged into the reservoir 37 and thereby the pressure thereof is decreased.

The ECU 50 also produces the control signals for the other wheels 2–4, and the two position valves 22–24, 32–34 assigned to the other wheels 2–4 are controlled in the same manner as described above. It is to be noted that the state of the control signals including the pressure increasing output, the pressure maintaining output and the pressure decreasing output may be changed depending on the kind of the previous control signal.

Figure 2:
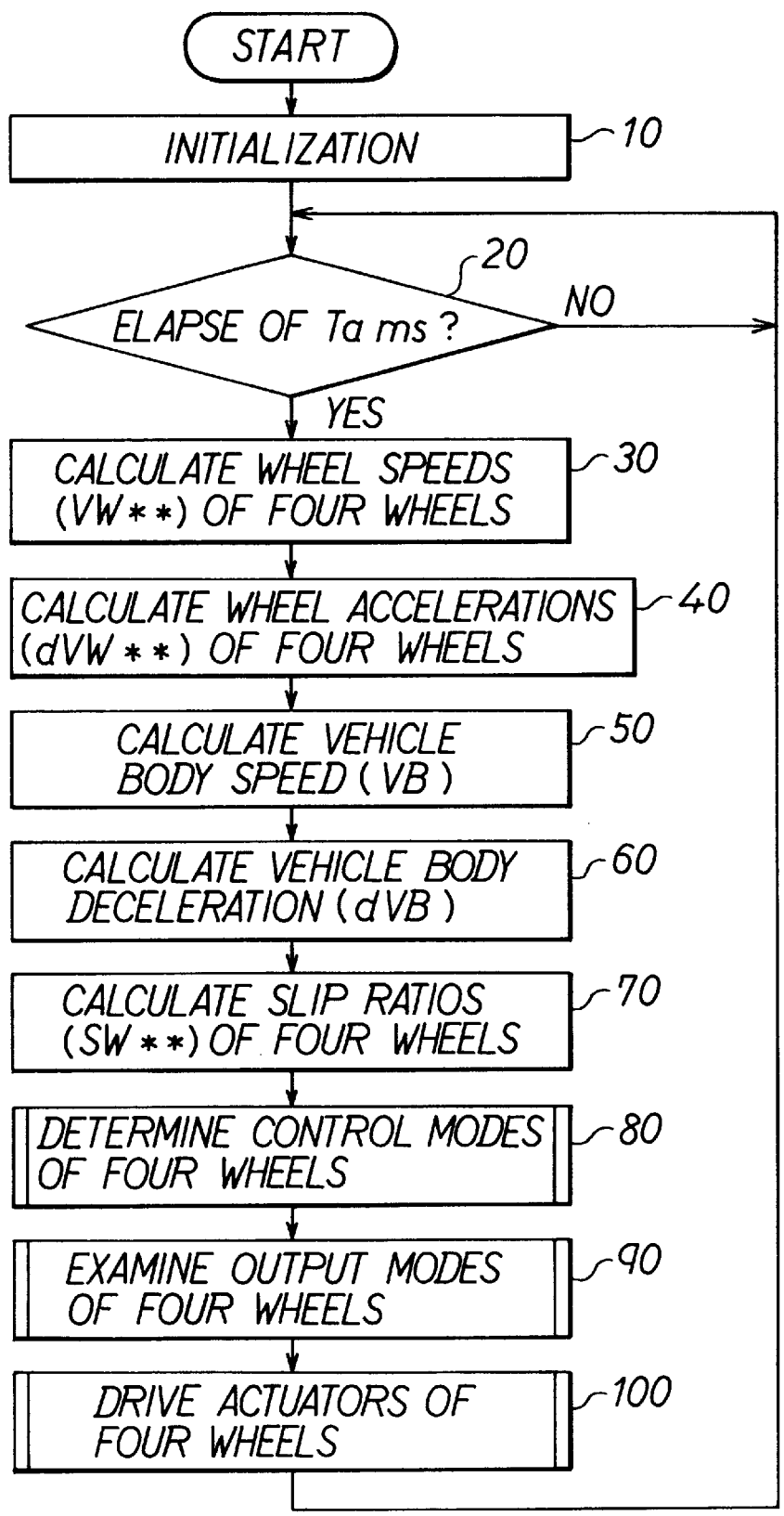
FIG. 2 is a flow diagram showing a main routine executed by an ECU of the anti-skid control system.

The details of the processing executed by the ECU 50 are described with reference to the flow diagrams shown in FIGS. 2–5. The ECU 50 executes the main routine shown in FIG. 2 when an ignition switch is turned on. It is to be noted that the main routine of FIG. 2 is executed for each of the wheels 1–4 by time sharing.

First, an initialization processing is carried out at step 10. In the initialization processing, the processing such that a memory is cleared and flags are reset is executed.

At the following step 20, it is determined whether a predetermined time (for example 5 ms) has elapsed from the last processing to carry out the processing of the step 30 and the followings for each predetermined time.

When the predetermined time has elapsed, the processing advances to step 30. At step 30, wheel speeds Vw** of the wheels are calculated based on rotational speed signals from the wheel speed sensors 5–8. Here, a symbol "* *" generically represents signs FR, FL, RR, RL showing the respective wheels 1–4. That is, Vw * * means VwFR, VwFL, VwRR and VwRL which are wheel speeds of the front-right wheel 1, the front-left wheel 2, the rear-right wheel 3 and the rear-left wheel 4.

At the following step 40, wheel accelerations dVw of the wheels 1–4 are calculated by differentiating the wheel speed Vw calculated at step 30. At step 50, a vehicle body speed (estimated vehicle body speed) is calculated based on a maximum speed Vwmax among the wheel speeds Vw** calculated at step 30. For example, it is determined whether the maximum speed Vwmax is in a range from an acceleration limit value Vα which is calculated by adding a predetermined value to the previous vehicle body speed VB(n−1) to a deceleration limit value Vβ which is calculated by subtracting a predetermined value from the previous vehicle body speed VB(n−1). When the maximum speed Vwmax is in the range from the acceleration limit value Vα to the deceleration limit value Vβ, the maximum speed Vwmax is set as the vehicle body speed VB as it is. When the maximum speed Vwmax exceeds the acceleration limit value Vα, the acceleration limit value Vα is set as the vehicle body speed VB. When the maximum speed Vwmax is lower than the deceleration limit value Vβ, the deceleration limit value Vβ is set as the vehicle body speed VB.

At step 60, a vehicle body deceleration dVB is calculated by differentiating the vehicle body speed VB calculated at step 40. At step 70, slip ratios SW** of the respective wheels 1–4 are calculated based on the calculated vehicle body speed VB and the respective wheel speeds VB* *. After that, at step 80, a control mode to be set for an actuator (two position valves 21–24, 31–34) assigned to each of the wheel 1–4 is determined based on the slip ratios SW* * and the wheel accelerations dVw**. The detailed processing of this step is described later with reference to a flow diagram showing a four wheel's control mode setting process in FIG. 3.

At step 90, an output mode set to each of the actuators for the wheels 1–4 is examined. When a pressure increasing output is not fed to any one of the actuators for the wheels 1–4 for a long time, at least one wheel is selected under predetermined conditions. A predetermined control mode is set for the actuator for the selected wheel instead of the control mode having set at step 80. The detailed processing of this step is described later with reference to a flow diagram showing a four wheel's output mode examination process in FIG. 4.

At step 100, the actuators for the wheels 1–4 are driven in accordance with the control modes set at step 80 and step 90.

Figure 3:
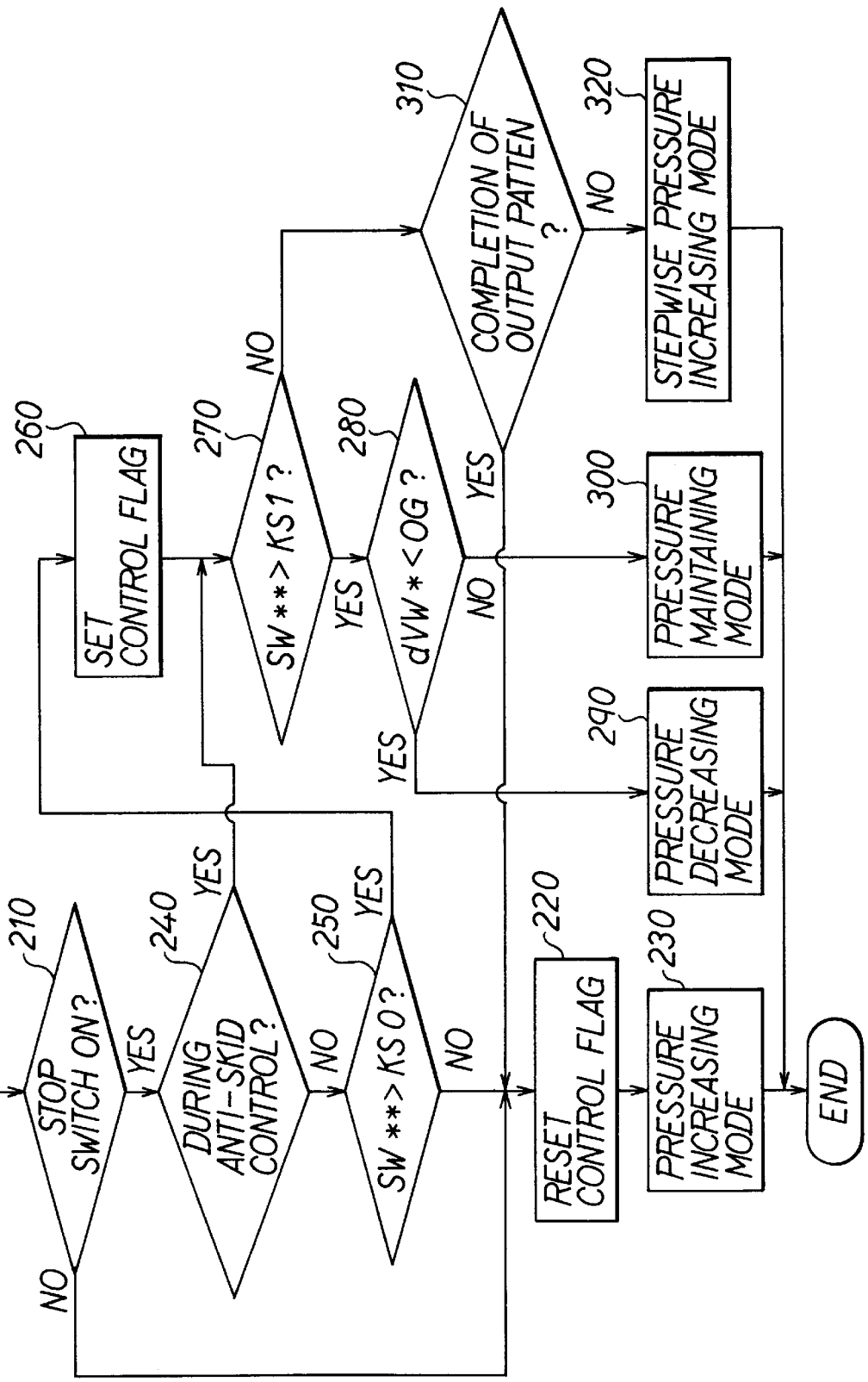
FIG. 3 is a flow diagram showing a four wheel's control mode setting process in FIG. 2.

Next, the detail processing of step 80 is described with reference to the flow diagram in FIG. 3. This processing is for setting control modes of the actuators (two position valves 21–24, 31–34) for the respective wheels 1–4 and is repeatedly executed four times for each of the front-right wheel 1, the front-left wheel 2, the rear-right wheel 3 and the rear-left wheel 4. In setting of the control mode, the specifics of a control signal fed to each of the actuators is further determined. For example, when a stepwise pressure increasing mode in which a pressure increasing output and a pressure maintaining output are alternatively generated is set as the control mode, a time for a pressure increasing output to be generated, a time for a pressure maintaining output to be generated, a number of pressure increasing outputs and the like are determined.

First, at step 210, it is determined whether the stop switch 26 is turned on, that is, the vehicle is started to be braked down. When the stop switch 26 is not turned on, a control flag prepared for an object wheel is reset at step 220 and the control mode of the actuator (two position valves 21–24, 31–34) for the object wheel is set to a pressure increasing mode at step 230. Then, the processing is terminated once. Here, the pressure increasing mode is a mode in which the pressure increasing output is successively generated. That is, the brake fluid pressure generated by the master cylinder 16 is supplied to the wheel cylinder 11–14 of the object wheel as it is.

When the stop switch 26 is turned on, it is determined at step 240 whether the control flag has been set. Because the control flag is still in a reset state immediately after the stop switch 26 is turned on, a negative determination is made at step 240. As a result, the processing advances to step 250. At step 250, it is determined whether the slip ratio SW of the object wheel is greater than a target slip ratio KS0 (for example 20%).

When a negative determination is made at step 250, the processing advances to step 220 and step 230. At steps 220, 230, as described above, the control flag is reset and the control mode of the actuator for the object wheel is set to the pressure increasing mode. On the other hand, when an affirmative determination is made at step 250, the processing advances to step 260 and the control flag is set.

At step 270, it is determined whether the slip ratio SW of the object wheel is greater than a predetermined slip ratio KS1. The predetermined slip ratio KS1 is less than the target slip ratio KS0. For example, when the target slip ratio KS0 is set to 20%, the predetermined slip ratio is set to 15%.

When an affirmative determination is made at step 270, the processing advances to step 280. At step 280, it is determined whether the wheel acceleration dVw of the object wheel is lower than zero acceleration (0 G), that is, the object wheel decelerates or accelerates. When an affirmative determination is made at step 280, the processing advances to step 290. At step 290, the control mode of the actuator for the object wheel is set to a pressure decreasing mode and the processing is terminated once. On the other hand, when a negative determination is made at step 280, the processing advances to step 300. At step 300, the control mode of the actuator for the object wheel is set to a pressure maintaining mode and the processing is terminated once.

Here, the pressure decreasing mode is a mode in which a pressure decreasing output and a pressure maintaining output are alternatively and repeatedly generated (for example, these two outputs are switched each 15 ms). The pressure maintaining mode is a mode in which a pressure maintaining output is successively generated. Therefore, when the wheel acceleration dVw of the object wheel is lower than 0 G, that is, the tendency for the object wheel to be locked is increasing, the brake fluid pressure of the wheel cylinder of the object wheel is gradually decreased due to the pressure decreasing mode. When the wheel acceleration dVw of the object wheel exceeds 0 G, i.e., the slippage of the object wheel is gradually reduced, the brake fluid pressure of the wheel cylinder of the object wheel is maintained due to the pressure maintaining mode.

It is to be noted that, with respect to the pressure decreasing mode, a switching cycle of the pressure decreasing output and the pressure maintaining output and the like are determined. In detail, as the number of the pressure increasing outputs is larger in the previous pressure increasing mode (or the sum of times during which pressure increasing outputs are generated is longer), a duty ratio of the pressure decreasing output is made larger.

When a negative determination is made at step 270, the processing advances to step 310. At step 310, it is determined whether an output pattern set in a stepwise pressure increasing mode is completely generated. Here, the output pattern is set so that a given number of pressure increasing outputs is generated each predetermined period and a pressure maintaining output is generated between the successive pressure increasing outputs. Therefore, the brake fluid pressure of the wheel cylinder of the object wheel is gradually increased in accordance with the output pattern.

It is to be noted that the cycle on which the pressure increasing output is generated is variable. When the cycle is set short, because the duty ratio of the pressure increasing output becomes large, the pressure increasing gradient becomes relatively steep. On the other hand, when the cycle is set long, because the duty ratio of the pressure increasing output becomes small, the pressure increasing gradient becomes relatively gentle. Also, the number of pressure increasing outputs can be variable.

The cycle on which the pressure increasing output is generated and the number of pressure increasing outputs can be determined based on the number of the pressure decreasing outputs generated in the previous pressure decreasing mode (or, an accumulated time during which the pressure decreasing outputs are generated). For example, if the accumulated time of the pressure decreasing output generated in the previous pressure decreasing mode is long, it is conceivable that a large amount of brake fluid pressure can be rapidly increased in a wheel cylinder. Therefore, in this case, the pressure increasing output generating cycle is set to be relatively short. To the contrary, if the accumulated time of the pressure decreasing output generated in the previous pressure decreasing mode is short, the pressure increasing output generating cycle is set to be relatively long.

In this way, although the timing at which the pressure increasing output is generated is different in case by case, it is possible to estimate the pressure increasing output generation timing in the stepwise pressure increasing mode based on the cycle determined in the above-mentioned manner.

When an affirmative determination is made at step 310, it is regarded that the slippage of the object wheel is completely reduced and there is no possibility of the object wheel being locked even if brake fluid pressure control ends. Therefore, at steps 220, 230, the control flag is reset and the control mode of the actuator for the object wheel is set to the pressure increasing control. That is, in a brake system, a normal brake operated by a driver becomes effective.

When a negative determination is made at step 310, the stepwise pressure increasing control mode continues to be set at step 320 and the processing is terminated once.

Figure 4:
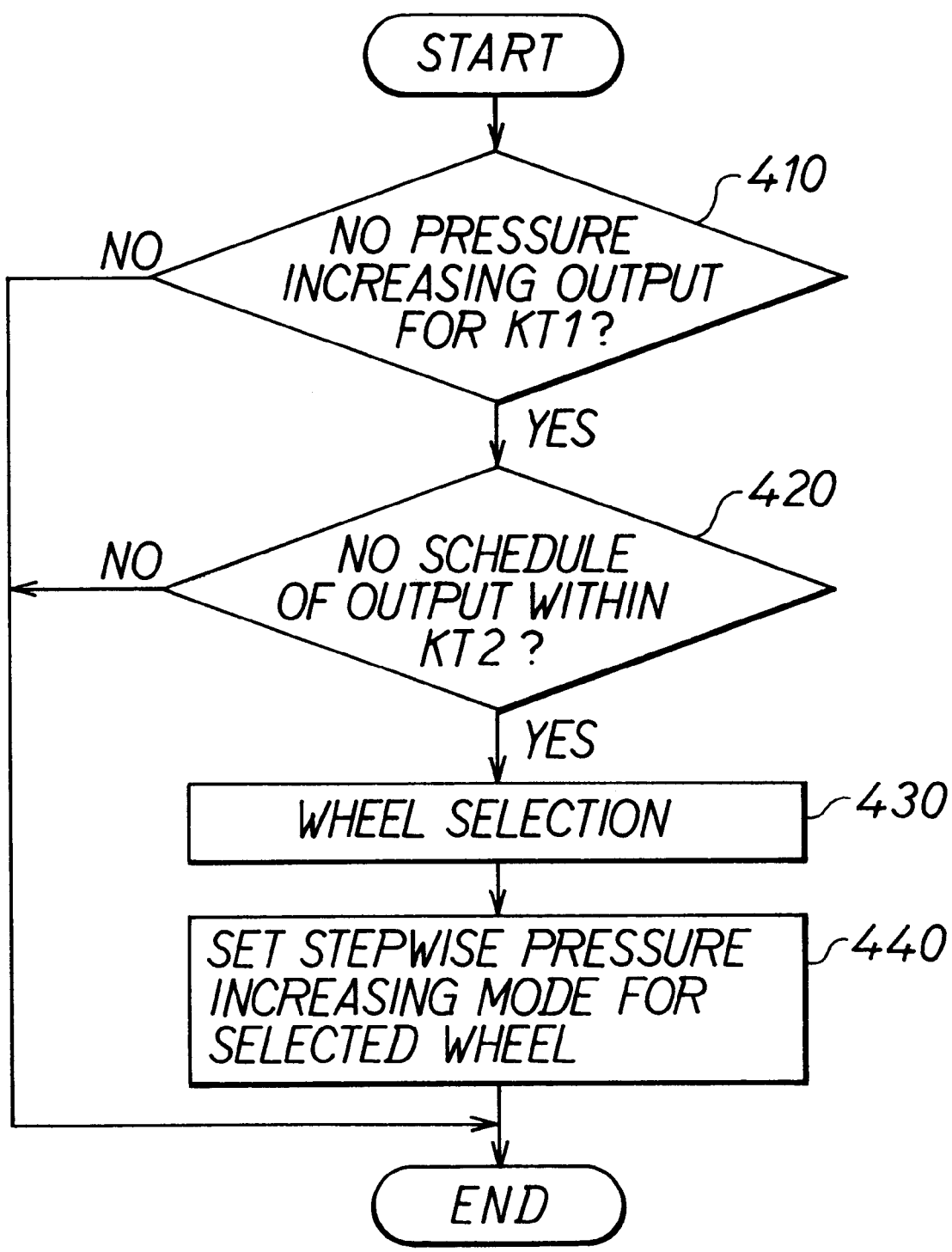
FIG. 4 is a flow diagram showing a four wheel's output mode examination process in FIG. 2.

Next, the detail processing of step 90 is described with reference to the flow diagram in FIG. 4. This processing is for selecting a wheel in which the pressure increasing output generation timing is shifted.

First, at step 410, it is determined whether no pressure increasing output is generated for the actuators of the four wheels 1–4 for at least a predetermined period KT1 after the pressure increasing output was fed to any of the actuators for the four wheels. If the pressure increasing output is not generated for a time period equal to or greater than the predetermined period KT1, because the brake fluid within the master cylinder 16 does not move into the wheel cylinders during the time period, a driver cannot depress the brake pedal and therefore may receive the fixed plate feeling from the brake pedal. When an affirmative determination is made at step 410, the processing advances to step 420. When a negative determination is made, the processing is terminated once.

The cases in which the affirmative determination is made at step 410 are as follows:

1. The predetermined period KT1 has elapsed while pressure decreasing mode or the pressure maintaining mode is being set for all the four wheels 1–4.

2. Although the pressure increasing mode is set for at least one wheel, the predetermined period KT1 has elapsed after the previous pressure increasing output was generated.

At step 420, it is determined whether no pressure increasing output is scheduled to be generated for any of the four wheels 1–4 until a predetermined period KT2 will elapse after the predetermined period KT1 has elapsed. That is, the sum of the predetermined period KT1 and the predetermined period KT2 is set so that the driver certainly receives the fixed plate feeling from the brake pedal if no pressure increasing output is generated to any of the pressure increasing valves 21–24 within the time of the sum. Therefore, if any of the pressure increasing valves 21–24 is not opened by the pressure increasing output until the predetermined period KT2 will elapse, an operational feeling of the brake pedal becomes worse.

For this reason, when an affirmative determination is made at step 420, the processing advances to step 430. At step 430, a wheel for which pressure increasing output generation timing is shifted is selected. This wheel selection is made based on times at which previous pressure increasing outputs were generated for the respective wheels 1–4. In detail, one wheel in which the longest time has elapsed from the previous pressure increasing output is selected. This is because it is conceivable that the wheel in which the longest time has elapsed from the previous pressure increasing output has a margin for pressure increasing since the W/C pressure thereof is relatively low.

When a negative determination is made at step 420, because it is conceivable that an operational feeling of the brake pedal does not become worse very much, the processing ends.

When one wheel is selected at step 430, the processing advances to step 440. At step 440, a control mode of an actuator (two position valves 21–24, 31–34) for the selected wheel is set to the stepwise pressure increasing mode instead of the control mode set at step 80 and the processing ends.

Figure 5:
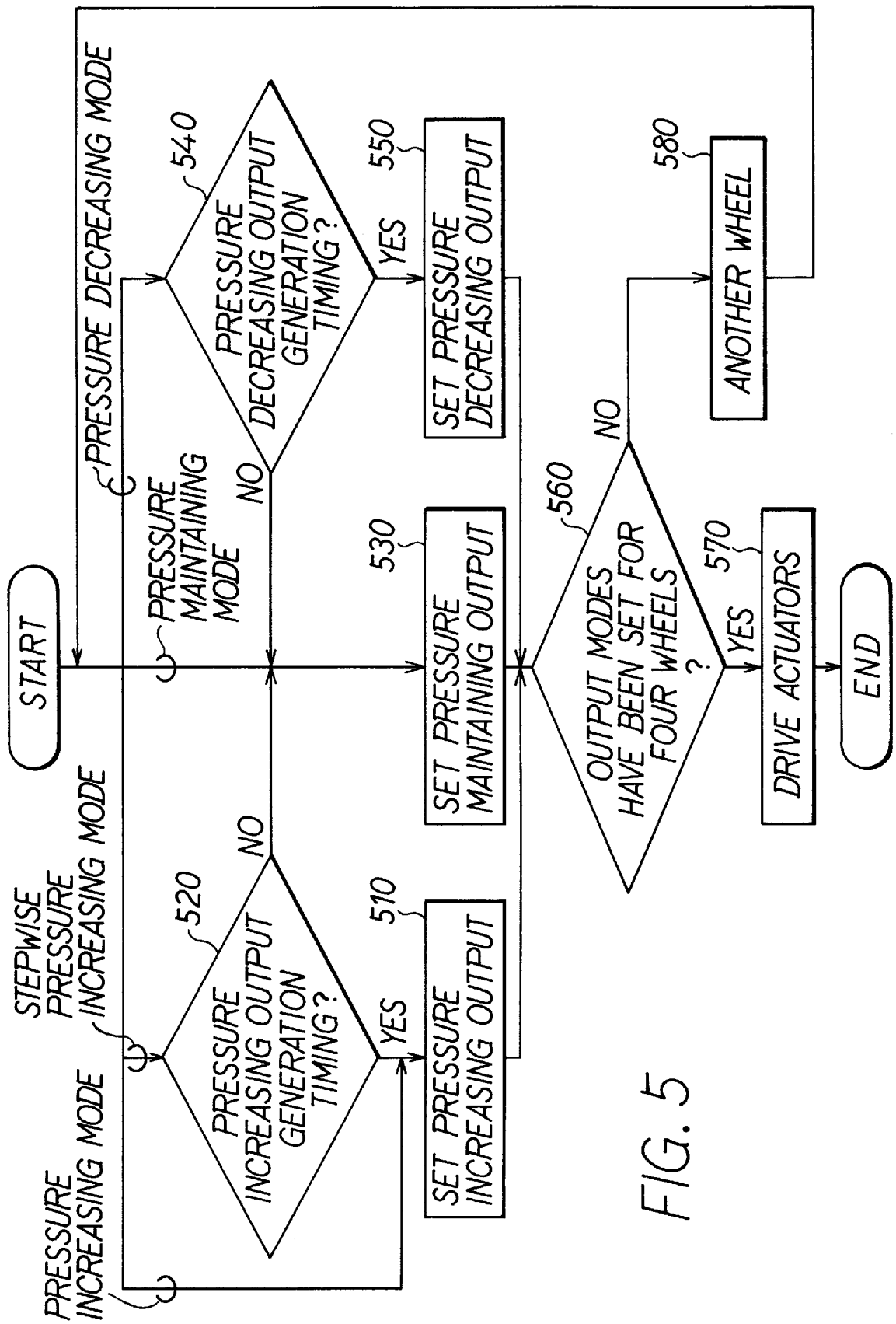
FIG. 5 is a flow diagram showing a four wheel's output control process in FIG. 2.

Next, the detail processing of step 100 is described with reference to the flow diagram in FIG. 5. In this processing, a pressure increasing output, a pressure maintaining output, or a pressure decreasing output is set in accordance with a control mode established to each of the wheels 1–4 at steps 80, 90, and control signals corresponding to each output are applied to solenoids of the pressure increasing valve (21–24) and the pressure decreasing valve (31–34). This processing is carried out four times to set output modes of the actuators for the four wheels 1–4.

When a control mode of a processing object wheel is a pressure increasing mode, the processing advances to step 510. At step 510, a pressure increasing output is set for the actuator of the processing object wheel.

When a control mode of a processing object wheel is a stepwise pressure increasing mode, the processing advances to step 520. At step 520, it is determined whether it is now pressure increasing output generation timing. This determination is made based on the pressure increasing output generating cycle and the number of the pressure increasing outputs set at step 80. When an affirmative determination is made herein, the processing advances to step 510, a pressure increasing output is set for the actuator of the processing object wheel. When a negative determination is made at step 520, a pressure maintaining output is set for the actuator of the processing object wheel at step 530.

When a control mode of a processing object wheel is a pressure maintaining mode, the processing advances to step 530, and a pressure maintaining output is set for an actuator of the processing object wheel.

When a control mode of a processing object wheel is a pressure decreasing mode, the processing advances to step 540. At step 540, it is determined whether it is now pressure decreasing output generation timing of the processing object wheel. This determination is also made based on the switching cycle of the pressure decreasing output and the pressure maintaining output determined at step 80. When an affirmative determination is made herein, the processing advances to step 550, a pressure decreasing output is set for the actuator of the processing object wheel. When a negative determination is made at step 540, a pressure maintaining output is set for the actuator of the processing object wheel at step 530.

After the output mode is set at step 510, 530, or 550, the processing advances to step 560. At step 560, it is determined whether the output mode has been set for each actuator of the four wheels 1–4. When an affirmative determination is made herein, the processing advances to step 570. At step 570, control signals in accordance with the output modes set for the respective wheels are applied to solenoids of the pressure increasing valves 21–24 and the pressure decreasing valves 31–34, whereby the pressure increasing valves 21–24 and the pressure decreasing valves 31–34 are moved to positions corresponding to the output modes, respectively. When a negative determination is made at step 560, another wheel is set as a processing object wheel at step 580.

Next the functions of the anti-skid control system are described with reference to FIG. 6. It is to be noted that, in FIG. 6, only pressure increasing outputs for two wheals are shown for brevity's sake. FIG. 6(a) shows pressure increasing output generation timing for a first wheel, FIG. 6(b) shows pressure increasing output generation timing for a second wheel, FIG. 6(c) shows an operation amount of a brake pedal in a so-called pump-less system in which the brake fluid discharged in a reservoir is returned toward a master cylinder without using a pump, and FIG. 6(d) shows an operation amount of a brake pedal in a system provided with a pump in which the brake fluid discharged in a reservoir is returned to a master cylinder using a pump. It is to be noted that, in FIG. 6(a), pressure increasing outputs show by slanting lines show normal pressure increasing output generation timing. The normal pressure increasing output generation timing is determined based on the pressure increasing output generating cycle, as described above.

Figure 6:
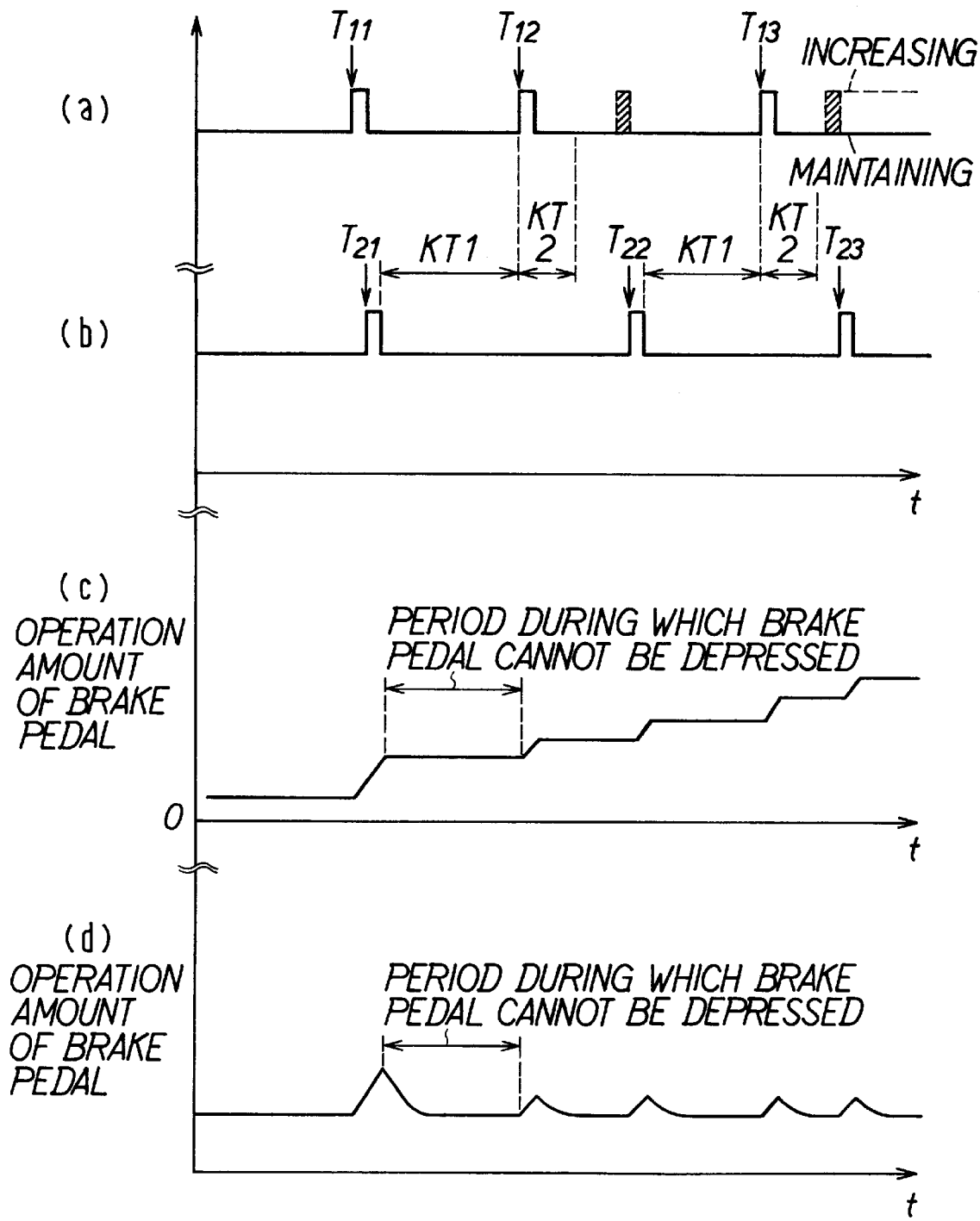
FIG. 6 is time charts for explaining functions of the anti-skid control system of FIG. 1.
Figure 7:
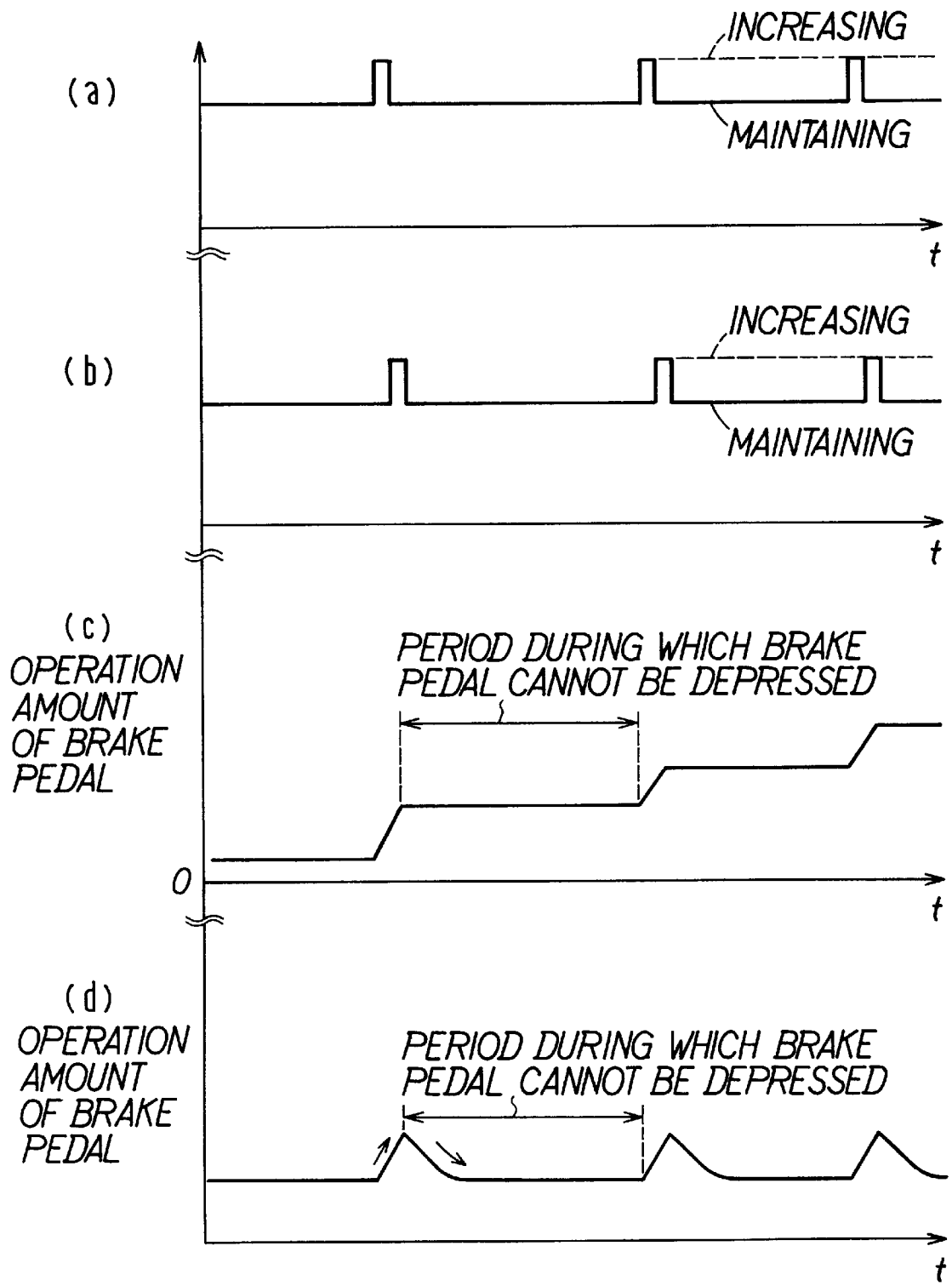
FIG. 7 is time charts showing operations of a conventional anti-skid control system.

As shown in FIG. 6, after the pressure increasing output is generated for the first wheel at a time T11 and the pressure increasing output is generated for the second wheel at a time T21 which is slightly later than the time T11, at a time that the predetermined period KT1 has elapsed, it is determined whether no pressure increasing output is scheduled to be generated for the first wheel or the second wheel within the next predetermined period KT2. If no pressure increasing output is scheduled to be generated, the pressure increasing output is applied to the actuator of the first wheel at a time T12 which is a point of time that the predetermined period KT1 has elapsed. After that, pressure increasing output generation timing for the first wheel is advanced to a time 13 as well. As a result, because pressure increasing output generation timing for the second wheel comes at each of times T22, T23, it is possible to avoid the case in which no pressure increasing output is generated for any of the first and second wheels before both the predetermined period KT1 and the predetermined KT2 elapse.

As shown in FIG. 6(a), if the pressure increasing output is applied to the actuators of the first and second wheels in accordance with normal pressure increasing output generation timing, no pressure increasing output is generated even after the predetermined period KT1 and the predetermined period KT2 elapse after the pressure increasing output is generated for the second wheel. As a result, because the driver cannot depress the brake pedal for a relatively long time, the driver receives the fixed plate feeling from the brake pedal.

However, in the present embodiment, before the driver receives the fixed plate feeling from the brake pedal, pressure increasing output generation timing for the first wheel in which the longest time has elapsed from the previous pressure increasing output is shifted to advance. Therefore, it is possible to prevent the driver from receiving the fixed plate feeling from the brake pedal.

Also, when pressure increasing output generation timing is shifted as mentioned above, the pressure increasing outputs being generated are dispersed. The operation amount of the brake pedal that the driver can depress at one time becomes small. For this reason, in the pump-less system, a stroke of the brake pedal 27 gradually changes, thereby making the operational feeling thereof smooth.

In the present embodiment, the wheel in which the longest time has elapsed from the previous pressure increasing output is selected as the wheel for which pressure increasing output generation timing is shifted. However, a wheel having the lowest slip ratio can be selected. As a result, it is possible to prevent the slip ratio of the wheel from being excessively large due to the generated pressure increasing output.

Also, a wheel in which the sum of pressure increasing output generation time periods is the smallest after a previous pressure decreasing output was generated may be selected. That is, it is conceivable that the wheel in which the sum of pressure increasing output generation time periods is the smallest has a lower W/C pressure than the other wheels. Therefore, even when the pressure increasing output is applied to the actuator of the selected wheel, it is possible to prevent the slip ratio of the wheel from being excessively large due to the pressure increasing output.

Further, when each of the W/C pressures can be directly or indirectly detected, as the wheel for which the pressure increasing output generation timing is shifted, the wheel having the smallest W/C pressure may be selected. The W/C pressure can be directly detected by a pressure sensor. Also, the W/C pressure can be indirectly detected from a vehicle body deceleration and time periods of pressure decreasing operations and pressure increasing operations. That is, because an initial W/C pressure corresponds to the vehicle body deceleration before the pressure decreasing operation is started, the initial W/C pressure can be estimated based on the vehicle body speed prior to the pressure decreasing operation. The change of the W/C pressure caused by the pressure decreasing operation and the pressure increasing operation can be calculated using a map showing a relation between a pressure decreasing duration and a pressure decreasing characteristic curve and a map showing a relation between a pressure increasing duration and a pressure increasing characteristic curve. Therefore, the W/C pressure can be indirectly detected by the estimated initial W/C pressure and the change of the W/C pressure cause by the pressure decreasing operation and the pressure increasing operation.

In the present embodiment, when an affirmative determination is made at step 410, it is determined whether no pressure increasing output is scheduled to be generated within the predetermined period KT2 at step 420. However, step 420 can be omitted. In this case, when the affirmative determination is made at step 410, the processing directly advances to steps 430, 440, and the pressure increasing output may be generated for the selected wheel at a time that the predetermined period KT1 has elapsed from the latest pressure increasing output. This processing is particularly effective when the main object of control is to prevent the driver from receiving the fixed plate feeling from the brake pedal while the pressure decreasing mode or the pressure maintaining mode is being set for all the four wheels. That is, for example, if the pressure increasing output generating cycle is limited to the predetermined period KT1, it is possible to prevent the driver from receiving the fixed plate feeling from the brake pedal by only determination at step 410.

Although pressure increasing output generation timing is shifted to generate the pressure increasing output within the predetermined period KT2 in the above-mentioned embodiment, the pressure increasing output may be generated for at least one wheel, irrespective of the pressure increasing output generation timing which has been set in advance. Further, when the wheel in which the control mode other than the stepwise pressure increasing mode is set to the actuator thereof is selected at step 90, the pressure increasing output is generated regardless of the control mode set at step 80.

(Second Embodiment)

Next, the second embodiment of the present invention is described with reference to FIGS. 8 through 12.

Because the anti-skid control system of the second embodiment has the same configuration with respect to the hydraulic circuit as the first embodiment, its description is omitted. Also, the main routine of the second embodiment is almost the same as the first embodiment. The second embodiment is different from the first embodiment in that, although in the first embodiment only the pressure increasing valve (21–24) is opened when no pressure increasing output is generated for a relatively long time, in the second embodiment the pressure decreasing valve (31–34) is also opened when a certain condition is fulfilled.

Hereinafter, only the different points from the first embodiment are described.

In the second embodiment, at step 90 of the main routine, an output mode set to each of the actuators for the wheels 1–4 is examined. Specifically, when a pressure increasing output is not fed to any one of the actuators for the wheels 1–4 for a predetermined time, that is, any of the pressure increasing valve 21–24 is not opened for the predetermined time, an optimal wheel for which the pressure increasing valve is opened is selected in accordance with predetermined conditions. Further, it is determined based on the control mode set for the selected wheel and the W/C pressure thereof whether the pressure decreasing valve is to be opened.

Figure 8:
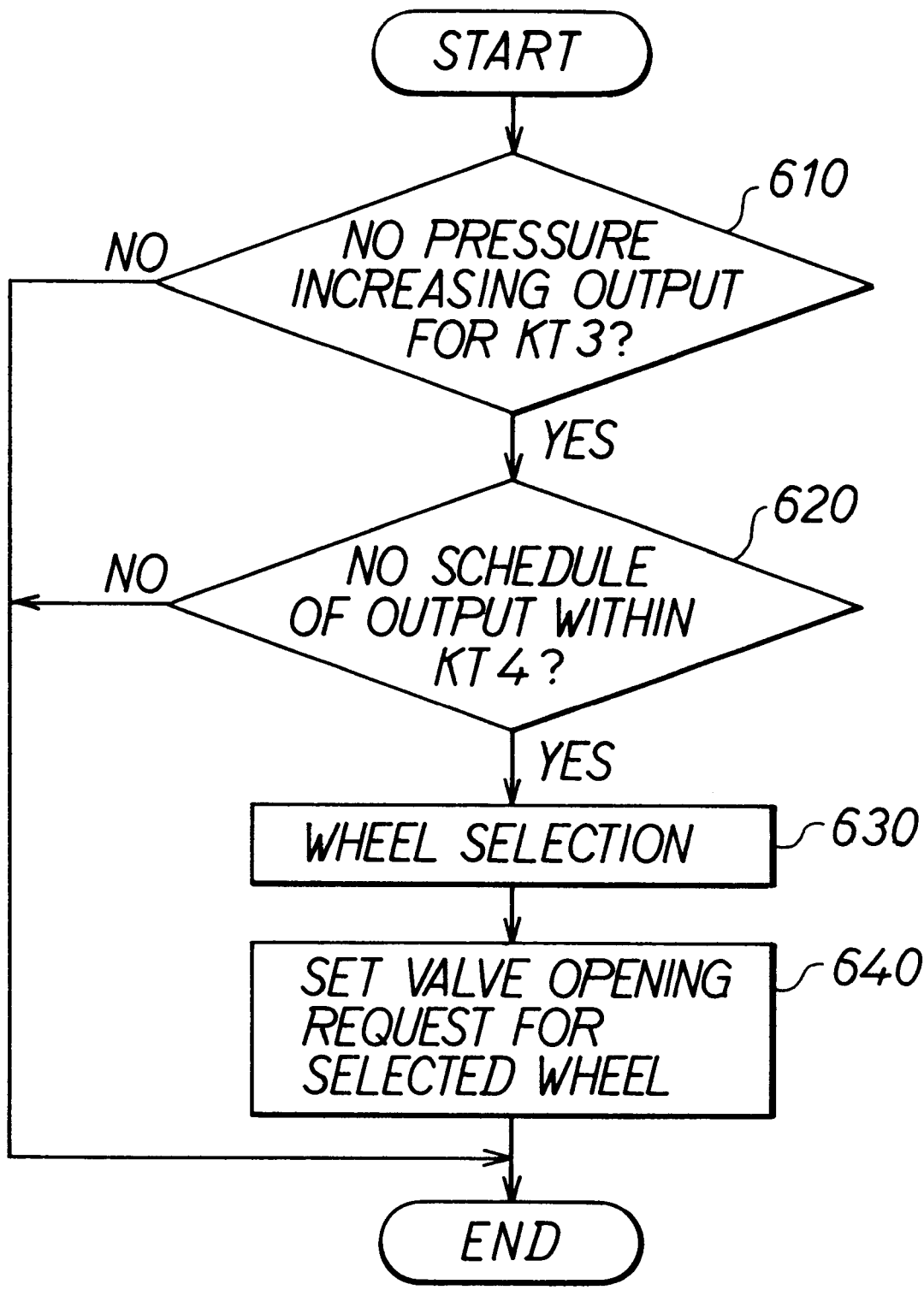
FIG. 8 is a flow diagram showing a four wheel's output mode determination process according to a second embodiment of the present invention.

The detail processing of step 90 according to the second embodiment is described with reference to FIG. 8.

First, at step 610, it is determined whether no pressure increasing output is generated to open any of the pressure increasing valves 21–24 for the four wheels 1–4 for at least a predetermined period KT3 after the pressure increasing output was fed to any of the pressure increasing valves 21–24 for the four wheels 1–4. If at least one pressure increasing valve is not opened for a time period equal to or greater than the predetermined period KT3, because the brake fluid within the master cylinder 16 does not move into the wheel cylinders during the time period, a driver cannot depress the brake pedal and therefore may receive the fixed plate feeling from the brake pedal. When an affirmative determination is made at step 610, the processing advances to step 620. When a negative determination is made, the processing is terminated once.

The cases in which the affirmative determination is made at step 610 are as follows:

1. The predetermined period KT3 has elapsed while pressure decreasing mode or the pressure maintaining mode is being set for all the four wheels 1–4.

2. Although the pressure increasing mode is set for at least one wheel, the predetermined period KT1 has elapsed after the previous pressure increasing output was generated.

At step 620, it is determined whether no pressure increasing valve is scheduled to be opened for any of the four wheels 1–4 until a predetermined period KT4 will elapse after the predetermined period KT3 has elapsed. That is, the sum of the predetermined period KT3 and the predetermined period KT4 is set so that the driver certainly receives the fixed plate feeling from the brake pedal if no pressure increasing valve is opened within the time of the sum. Therefore, if any of the pressure increasing valves 21–24 is not opened by the pressure increasing output until the predetermined period KT4 will elapse, an operational feeling of the brake pedal becomes worse.

For this reason, when an affirmative determination is made at step 620, the processing advances to step 630. At step 630, a wheel for which a pressure increasing valve (and occasionally a pressure decreasing valve also) is opened is selected. This wheel selection is made based on which of the reservoirs 37, 39 has an enough room to accumulate the brake fluid. Specifically, at least one wheel having a wheel cylinder connected to the reservoir having the enough room to accumulate the brake fluid is selected.

When a negative determination is made at step 620, because it is conceivable that an operational feeling of the brake pedal does not become worse very much, the processing ends.

When one wheel is selected at step 630, the processing advances to step 640. At step 640, a valve opening request is set for the actuator (pressure increasing valve and pressure decreasing valve) for the selected wheel in consideration of a control mode set to the actuator at step 80 and the W/C pressure of the selected wheel. That is, in the valve opening request, two kinds of requests are switched in accordance with the control mode and the W/C pressure. One of the requests is a pressure increasing valve opening request, and the other of the requests includes a pressure decreasing valve opening request in addition to the pressure increasing valve opening request.

When the control mode set for the selected wheel is the stepwise pressure increasing mode, or when the control mode set for the selected wheel is the pressure maintaining mode and the W/C pressure of the selected wheel is more than an atmospheric pressure, only the pressure increasing valve opening request is set. In these cases, because the W/C pressure of the selected wheel needs to be maintained, the pressure decreasing valve (31–34) is not opened to prevent the W/C pressure from being decreased.

When the control mode set for the selected wheel is the pressure maintaining mode and the W/C pressure thereof is substantially the atmospheric pressure, or when the control mode is the pressure decreasing mode, the pressure decreasing valve opening request as well as the pressure increasing valve opening request are set. This is because, in these cases, the W/C pressure does not have to be maintained.

Whether the W/C pressure is substantially the atmospheric pressure can be determined directly by using a pressure sensor or indirectly based on the vehicle body deceleration and time periods of a pressure decreasing operation and a pressure increasing operation. Because an initial W/C pressure corresponds to the vehicle body deceleration before the pressure decreasing operation is started, the initial W/C pressure can be estimated based on the vehicle body speed prior to the pressure decreasing operation. The change of the W/C pressure caused by the pressure decreasing operation and the pressure increasing operation can be calculated using a map showing a relation between a pressure decreasing duration and a pressure decreasing characteristic curve and a map showing a relation between a pressure increasing duration and a pressure increasing characteristic curve. Therefore, the W/C pressure can be indirectly detected by the estimated initial W/C pressure and the change of the W/C pressure cause by the pressure decreasing operation and the pressure increasing operation.

Figure 9:
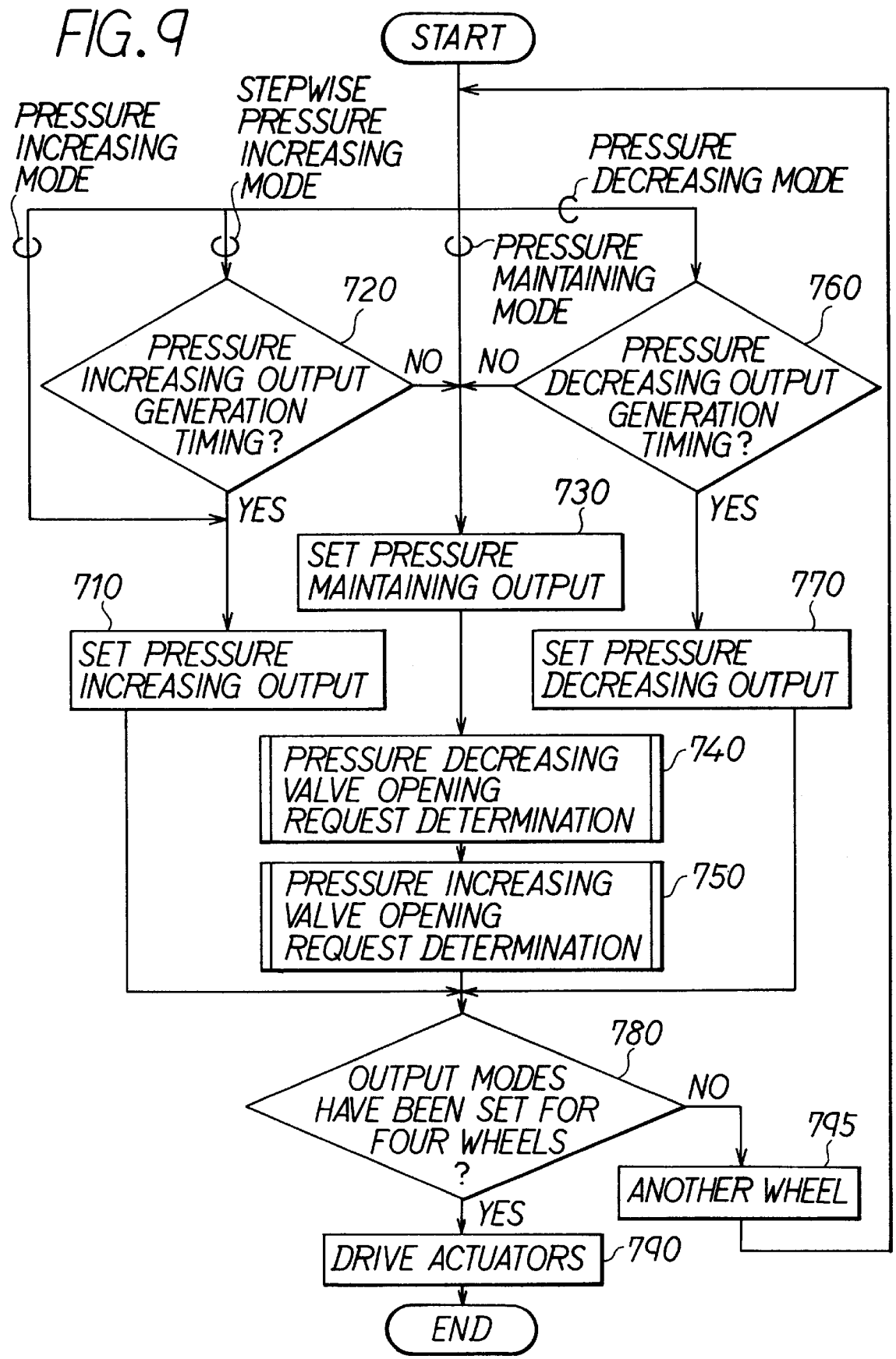
FIG. 9 is a flow diagram showing a four wheel's output control process according to the second embodiment.
Figure 10:
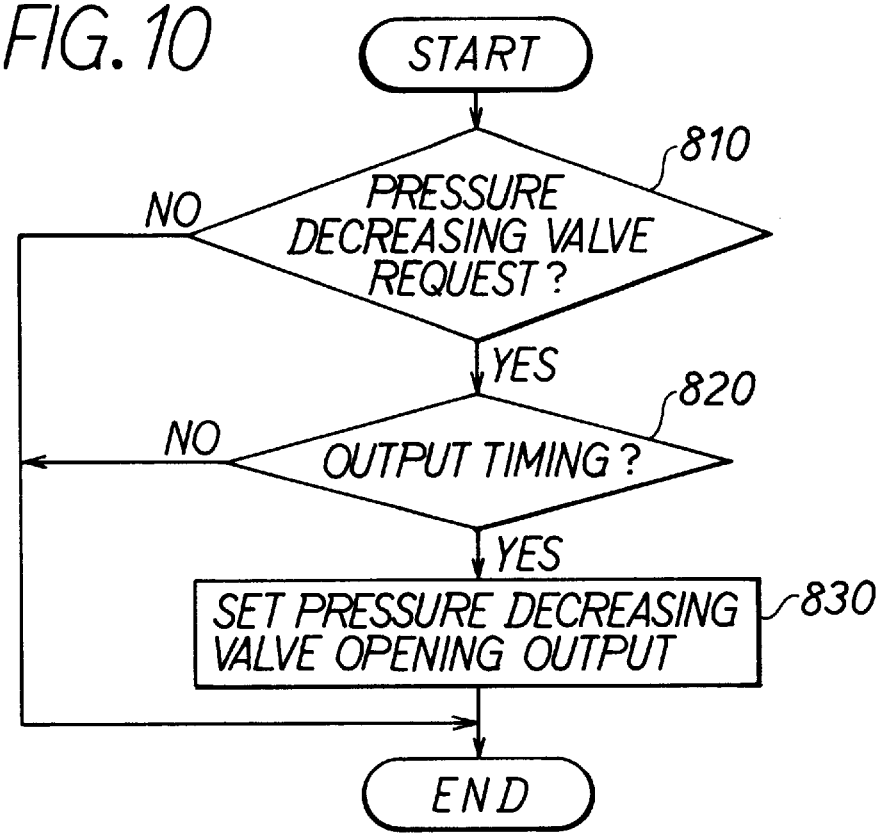
FIG. 10 is a flow diagram showing a pressure decreasing valve opening output determination process in FIG. 9.
Figure 11:
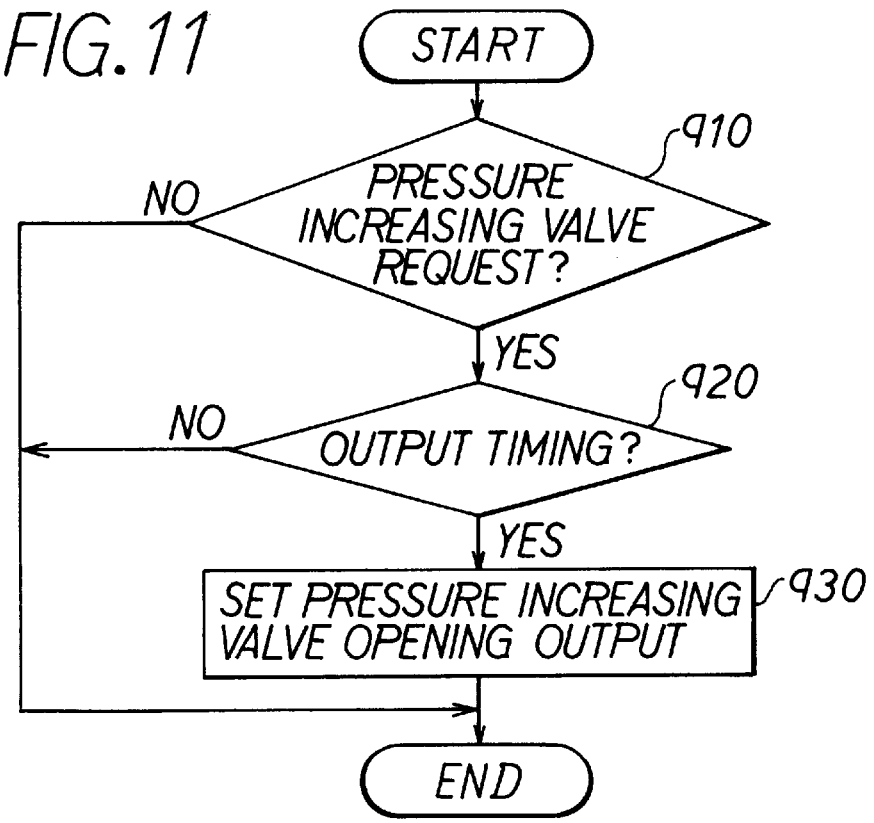
FIG. 11 is a flow diagram showing a pressure maintaining valve opening output determination process in FIG. 9.
Figure 13:
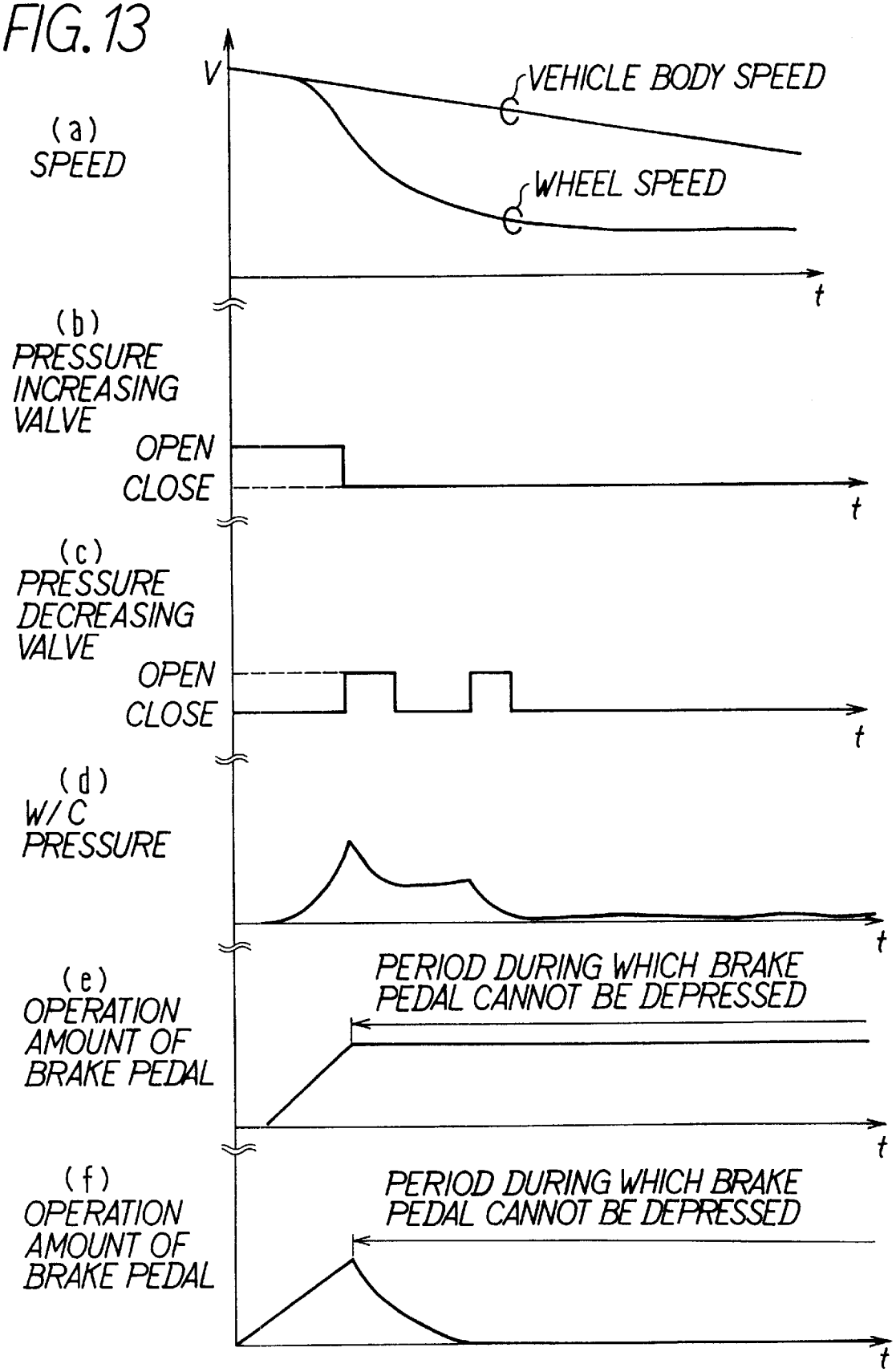
FIG. 13 is time charts showing operations of a conventional anti-skid control system.

Next, the detail processing of step 100 according to the second embodiment is described with reference to the flow diagrams in FIGS. 9, 10, 11. In this processing, a pressure increasing output, a pressure maintaining output, or a pressure decreasing output is set in accordance with a control mode established to each of the wheels 1–4 at step 80 while the valve opening request set at step 90 is given priority over the control mode set at step 80. Control signals corresponding to each output are applied to solenoids of the pressure increasing valve (21–24) and the pressure decreasing valve (31–34). This processing is carried out four times to set output modes of the actuators for the four wheels 1–4.

When a control mode of a processing object wheel is a pressure increasing mode, the processing advances to step 710. At step 710, a pressure increasing output is set for the actuator of the processing object wheel.

When a control mode of a processing object wheel is a stepwise pressure increasing mode, the processing advances to step 720. At step 720, it is determined whether it is now pressure increasing output generation timing. This determination is made based on the pressure increasing output generating cycle and the number of the pressure increasing outputs set at step 80. When an affirmative determination is made herein, the processing advances to step 710, a pressure increasing output is set for the actuator of the processing object wheel. When a negative determination is made at step 720, a pressure maintaining output is set for the actuator of the processing object wheel at step 730.

When a control mode of a processing object wheel is a pressure maintaining mode, the processing advances to step 730, and a pressure maintaining output is set for an actuator of the processing object wheel.

When a control mode of a processing object wheel is a pressure decreasing mode, the processing advances to step 760. At step 760, it is determined whether it is now pressure decreasing output generation timing of the processing object wheel. This determination is also made based on the switching cycle of the pressure decreasing output and the pressure maintaining output determined at step 80. When an affirmative determination is made herein, the processing advances to step 770, a pressure decreasing output is set for the actuator of the processing object wheel. When a negative determination is made at step 760, a pressure maintaining output is set for the actuator of the processing object wheel at step 730.

After the pressure maintaining output is set for the actuator of the processing object wheel at step 730, the processing advances to step 740. At step 740, a pressure decreasing valve opening request determination is carried out. The detail processing of the pressure decreasing valve opening request determination is shown in FIG. 10.

In this processing, when the pressure increasing valve (21–24) assigned to the selected wheel is opened, it is determined based on the valve opening request set at step 640 whether the pressure decreasing valve (31–34) assigned thereto is also opened.

At step 810, it is determined whether the pressure decreasing valve opening request has been set at step 640. When an affirmative determination is made herein, the processing advances to step 820. When a negative determination is made, the processing ends.

At step 820, it is determined whether it is now timing for opening the pressure decreasing valve (31–34). That is, the time period during which the pressure decreasing valve is opened is determined in advance. For example, the pressure decreasing valve is successively opened for a time period TR1. Therefore, during the time period TR1, it is determined that it is timing for opening the pressure decreasing valve, and after the elapse of the time period TR1, it is determined that it is not timing for opening the pressure decreasing valve. As a result, after the predetermined period KT3 has elapsed in a state that all the pressure increasing valves 21–24 are closed, the pressure decreasing valve assigned for the selected wheel is opened for the time period TR1. The time period TR1 does not need to be constant, but may be changed in accordance with the W/C pressure.

When an affirmative determination is made at step 820, a pressure decreasing valve opening output is set at step 830. When a negative determination is made at step 820, the processing ends without carrying out step 830. If the pressure decreasing valve opening output is set in this way, the pressure decreasing valve opening output is given priority over the pressure maintaining output previously set at step 730, and the pressure decreasing valve is forcibly opened.

After the processing of the pressure decreasing valve opening request determination is finished, the processing of a pressure increasing valve opening request determination is carried out at step 750. The detail processing of the pressure increasing valve opening request determination is shown in FIG. 11.

In this processing, it is determined based on the valve opening request set at step 640 whether the pressure increasing valve (21–24) assigned to the selected wheel is opened.

At step 910, it is determined whether the pressure increasing valve opening request has been set at step 640. When an affirmative determination is made herein, the processing advances to step 920. When a negative determination is made, the processing ends.

At step 920, it is determined whether it is now timing for opening the pressure increasing valve (21–24). That is, the time period during which the pressure increasing valve is opened is determined in advance. For example, the pressure increasing valve is successively opened for a time period TH1. Therefore, during the time period TH1, it is determined that it is timing for opening the pressure increasing valve, and after the elapse of the time period THI, it is determined that it is not timing for opening the pressure increasing valve. As a result, after the predetermined period KT3 has elapsed in a state that all the pressure increasing valves 21–24 are closed, the pressure increasing valve assigned for the selected wheel is opened for the time period TH1. The time period TH1 does not need to be constant, but may be changed in accordance with the W/C pressure.

When an affirmative determination is made at step 920, a pressure increasing valve opening output is set at step 930. When a negative determination is made at step 920, the processing ends without carrying out step 930. If the pressure increasing valve opening output is set in this way, the pressure increasing valve opening output is given priority over the pressure maintaining output previously set at step 730, and the pressure increasing valve (21–24) assigned for the selected wheel is forcibly opened.

Here, when the pressure decreasing output is set at step 770, the pressure decreasing valve opening request determination is not carried out at step 740. This is because the pressure decreasing valve is opened in accordance with the pressure decreasing output at step 770.

After the output mode is set in this way, the processing advances to step 780. At step 78C, it is determined whether the output mode has been set for each actuator of the four wheels 1–4. When an affirmative determination is made herein, the processing advances to step 790. At step 790, control signals in accordance with the output modes set for the respective wheels are applied to solenoids of the pressure increasing valves 21–24 and the pressure decreasing valves 31–34, whereby the pressure increasing valves 21–24 and the pressure decreasing valves 31–34 are moved to positions corresponding to the output modes, respectively. When a negative determination is made at step 780, another wheel is set as a processing object wheel at step 795.

Next, the functions of the anti-skid control system according to the second embodiment is described with reference to FIG. 12. It is to be noted that, in FIG. 12, only the wave forms relating to the selected wheel are shown for brevity's sake. FIG. 12(*a*) shows the vehicle body speed and the wheel speed, FIG. 12(*b*) shows opening and closing timing of the pressure increasing valve assigned for the selected wheel, FIG. 12(*c*) shows opening and closing timing of the pressure decreasing valve assigned for the selected wheel, FIG. 12(*d*) shows the W/C pressure of the selected wheel, FIG. 12(*e*) shows an operation amount of a brake pedal in a so-called pump-less system in which the brake fluid discharged in a reservoir is returned toward a master cylinder without using a pump, and FIG. 12(*f*) shows an operation amount of a brake pedal in a system provided with a pump in which the brake fluid discharged in a Reservoir is returned to a master cylinder using a pump.

As shown in FIG. 12(*a*), when the wheel speed lowers relative to the vehicle body speed, the pressure decreasing mode is set as the control mode, and the pressure decreasing operation is started. After that, when the lowering of the wheel speed stops and the tendency for the wheel to be locked becomes small, the pressure maintaining mode is set as the control mode. While the pressure decreasing mode and the pressure maintaining mode are set as the control mode, as shown in FIG. 12(*b*), the pressure increasing valve (21–24) continues to be closed.

However, if the state that all the pressure increasing valves 21–24 are closed lasts for the predetermined period KT3 as described above, and further if none of the pressure increasing valves 21–24 is scheduled to be opened within the next predetermined period KT4, at a time when the predetermined period KT3 has elapsed, at least one wheel is selected and the pressure increasing valve assigned for the selected wheel is opened. As a result, because any of the pressure increasing valves 21–24 is opened before both the predetermined period KT3 and the predetermined period KT4 elapse, the driver can depress the brake pedal prior to receiving the fixed plate feeling from the brake pedal 27.

In an example shown in FIG. 12, the pressure decreasing valve assigned for the selected wheel is also opened (FIG. 12(*c*)) along with the pressure increasing valve. That is, as shown in FIG. 12(*d*), because the W/C pressure is substantially the atmospheric pressure due to the pressure decreasing operation carried out earlier, the W/C pressure does not have to be maintained. Therefore, the pressure decreasing valve as well as the pressure increasing valve are opened. As a result, it is possible to prevent the W/C pressure from being increased.

In the second embodiment, at least one wheel having a wheel cylinder connected to the reservoir having an enough room to accumulate the brake fluid is selected at step 630. In this wheel selection, the reservoir having a smaller amount of the brake fluid accumulated therein is determined to have the enough room to accumulate the brake fluid. The brake fluid amount accumulated in the reservoir can be directly detected by a stroke of a piston disposed therein and can be indirectly detected by the sum of the pressure decreasing output generation periods.

In the wheel selection at step 630, a wheel for which the pressure decreasing mode is being set may be selected.

When the pressure decreasing mode is set, the wheel is in a state that the pressure decreasing valve assigned for the wheel can be opened. In this case, when both the pressure increasing valve and the pressure decreasing valve are opened, it is possible to prevent the driver from receiving the fixed plate feeling from the brake pedal 27 without increasing the W/C pressure.

However, it is to be noted that, when the wheel for which the pressure decreasing mode is being set is selected as the wheel of which the pressure Increasing valve and the pressure decreasing valve are opened, it is preferable that both the pressure increasing valve and pressure decreasing valve is opened when the pressure maintaining output is generated in the pressure decreasing mode. This is because there arises a possibility that a desired pressure decreasing operation cannot be carried out if the pressure increasing valve is opened during generation of the pressure decreasing output.

Further, in the wheel selection at step 630, a wheel in which the longest time has elapsed from the previous pressure increasing output is selected. Also, a wheel having the lowest slip ratio can be selected. As a result, it is possible to prevent the slip ratio of the wheel from being excessively large.

It is to be noted that, when the wheel for which the pressure decreasing mode is being set is selected or when the wheel having the lowest slip ratio is selected, the control method as described above is effective in not only the pump-less system shown in FIG. 1 but also the system provided with a pump.

What is claimed is:

1. An anti-skid control system comprising:
   a plurality of wheel cylinders for respectively generating wheel braking force at a plurality of wheels during vehicle braking;
   a master cylinder for supplying brake fluid to said wheel cylinders;
   slipping state detecting means for detecting a slipping state of each of said wheels; and
   anti-skid control performing means for performing anti-skid control by adjusting brake fluid pressure acting on each of said wheel cylinders based on said slipping state detected by said slipping state detecting means,
   wherein said anti-skid control performing means comprises:
      valves disposed between said master cylinder and said wheel cylinders, said valves being actuated to adjust brake fluid pressure acting on each of said wheel cylinders; and
      determining means for determining whether a pressure increasing output signal for causing said valves to increase brake fluid pressure to said wheel cylinders is generated for any of said valves during at least a first predetermined time period,
      wherein, when said determining means determines that no pressure increasing output signal is generated for any of said valves for at least said first predetermined time period, said anti-skid control performing means controls said valves so that said brake fluid flows from said master cylinder into at least one wheel cylinder via said valves.

2. An anti-skid control system according to claim 1, wherein said determining means further determines, when said first predetermined time period has elapsed, whether a pressure increasing output signal is scheduled to be generated for any of said valves before a second predetermined time period will elapse, and, when said determining means determines that no pressure increasing output signal is scheduled to be generated within said second predetermined time period, said anti-skid control performing means controls said valves within said second predetermined time period.

3. An anti-skid control system according to claim 2, wherein said anti-skid control performing means implements stepwise pressure increasing mode, in which said pressure increasing output signal is generated during each of a third predetermined period and a pressure maintaining output signal is generated between two pressure increasing output signals to gradually increase brake fluid pressure of said wheel cylinders, and said determining means determines whether the pressure increasing output signal is not scheduled to be generated for any of said valves before the second predetermined time period will elapse based on said third predetermined period.

4. An anti-skid control system according to claim 3, wherein said third predetermined period is determined based on an amount of pressure reduction in a wheel cylinder during a previously carried out decreasing mode.

5. An anti-skid control system according to claim 3, wherein a number of said pressure increasing output signals are determined at a time of starting said stepwise pressure increasing mode.

6. An anti-skid control system according to claim 1, wherein said anti-skid control performing means controls said valves so that said brake fluid flows from said master cylinder into at least one wheel cylinder by advancing, in time, the generation of the timing of said pressure increasing output signal which has been set by said anti-skid control performing means to adjust brake fluid pressure of at least one wheel cylinder of said wheel cylinders.

7. An anti-skid control system according to claim 1, wherein said anti-skid control performing device controls said valves so that said brake fluid flows from said master cylinder into at least one wheel cylinder irrespective of a pressure increasing mode set by said anti-skid control performing means to adjust brake fluid pressure of said wheel cylinders.

8. An anti-skid control system according to claim 1, wherein said anti-skid control performing means selects, among said wheels, a wheel in which the longest time has elapsed from a previous pressure increasing output signal and controls said valves so that brake fluid flows from said master cylinder into a wheel cylinder of the selected wheel.

9. An anti-skid control system according to claim 1, wherein said anti-skid control performing means selects a wheel which has the lowest slip ratio and controls said valves so that brake fluid flows from said master cylinder into a wheel cylinder of the selected wheel.

10. An anti-skid control system according to claim 1, wherein said anti-skid control performing means selects a wheel in which a pressure increasing output generation time period is the shortest after a pressure decreasing output is generated, and controls said valves so that brake fluid flows from said master cylinder into a wheel cylinder of a selected wheel.

11. An anti-skid control system according to claim 1, wherein said anti-skid control performing means selects a wheel having the smallest wheel cylinder pressure, and controls said valves so that brake fluid flows from said master cylinder into a wheel cylinder of a selected wheel.

12. The anti-skid control system of claim 1, wherein the anti-skid control performing means controls the valves to increase the brake fluid pressure acting on each of said wheel cylinders when a pressure maintaining output signal is generated during said first predetermined time period.

13. An anti-skid control system comprising:
   a first wheel cylinder for generating wheel braking force at a first wheel during vehicle braking;
   a second wheel cylinder for generating wheel braking force at a second wheel during vehicle braking;
   a third wheel cylinder for generating wheel braking force at a third wheel during vehicle braking;
   a fourth wheel cylinder for generating wheel braking force at a fourth wheel during vehicle braking;
   a master cylinder for supplying brake fluid to said first to fourth wheel cylinders;
   a first conduit connecting said master cylinder with said first and second wheel cylinders;
   a second conduit connecting said master cylinder with said third and fourth wheel cylinders;
   slipping state detecting means for detecting a slipping state of each of said first to fourth wheels;
   anti-skid control means for performing anti-skid control by adjusting brake fluid pressure acting on each of said first to fourth wheel cylinders based on said slipping state detected by said slipping state detecting means;

a reservoir for accumulating brake fluid discharged from said first to fourth wheel cylinders;

pressure decreasing valves actuated by said anti-skid control means for controlling brake fluid discharge from each of said first to fourth wheel cylinders to said reservoir;

pressure increasing valves actuated by said anti-skid control means for controlling brake fluid flow from said master cylinder to each of said first to fourth wheel cylinders; and determining means for determining whether a pressure increasing output signal for causing said pressure increasing valves to increase break fluid pressure to said wheel cylinders is generated for any of said pressure increasing valves for at least a predetermined time period, wherein, when said determining means determines that the pressure increasing output signal is not generated for any of said pressure increasing valves for at least said predetermined time period, said anti-skid control means forcibly opens at least one of said pressure increasing valves so that said brake fluid flows from said master cylinder into at least one wheel cylinder via said valves.

14. The anti-skid control system of claim 13, wherein the anti-skid control performing means controls the valves to increase the brake fluid pressure acting on each of said wheel cylinders when a pressure maintaining output signal is generated during said first predetermined time period.

15. An anti-skid control system comprising:

a plurality of wheel cylinders for respectively generating wheel braking force at a plurality of wheels during vehicle braking;

a master cylinder for supplying brake fluid to said wheel cylinders;

slipping state detecting means for detecting a slipping state of each of said wheels; and anti-skid control performing means for performing anti-skid control by adjusting brake fluid pressure acting on each of said wheel cylinders based on said slipping state detected by said slipping state detecting means, wherein said anti-skid control performing means comprises:

pressure increasing valves respectively disposed between said master cylinder and said wheel cylinders to control brake fluid flow therebetween; and first determining means for determining whether said brake fluid flow between said master cylinder and said wheel cylinders is prohibited by each of said pressure increasing valves for at least a first predetermined time, wherein, when said first determining means determines that said brake fluid flow between said master cylinder and said wheel cylinders is prohibited by each of said pressure increasing valves for at least the first predetermined time, said anti-skid control performing means selects at least one wheel from said plurality of wheels and actuates a pressure increasing valve corresponding to a wheel cylinder of a selected wheel into an opening state.

16. An anti-skid control system according to claim 15 further comprising:

second determining means for determining whether any of said pressure increasing valves is scheduled to be opened before a second predetermined time period will elapse after said first predetermined time period has elapsed, wherein, when said determining means determines that none of said pressure increasing valves is scheduled to be opened within said second predetermined time period, said anti-skid control performing means selects at least one wheel from said wheels and actuates a pressure increasing valve corresponding to a wheel cylinder of a selected wheel into an opening state.

17. An anti-skid control system according to claim 15, wherein said anti-skid control performing means changes a time period during which the pressure increasing valve is actuated into the opening state in accordance with a brake fluid pressure of the wheel cylinder of the selected wheel.

18. An anti-skid control system according to claim 15, further comprising:

a reservoir for accumulating brake fluid discharges from said wheel cylinders; and pressure decreasing valves respectively disposed between said wheel cylinders and said reservoir to control brake fluid discharge from said wheel cylinders to said reservoir, wherein, when said first determining means determines that said brake fluid flow between said master cylinder and said wheel cylinders is prohibited by each of said pressure increasing valves for at least the first predetermined time, said anti-skid control performing means actuates a pressure decreasing valve corresponding to the wheel cylinder of the selected wheel into an opening state.

19. An anti-skid control system according to claim 18, wherein said anti-skid control performing means stops to actuate said pressure decreasing valve into the opening state when a brake fluid pressure of the wheel cylinder of the selected wheel is being maintained.

20. An anti-skid control system according to claim 18, wherein said anti-skid control performing means stops to actuate said pressure decreasing valve into the opening state when a brake fluid pressure of the wheel cylinder of the selected wheel is being increased.

21. The anti-skid control system of claim 18, wherein said anti-skid control performing means actuates said pressure decreasing valve into said opening state when a pressure maintaining output signal is generated during said first predetermined time period.

22. An anti-skid control system according to claim 15, wherein said anti-skid control performing means selects a wheel in which the longest time has elapsed after a pressure increasing valve previously opened.

23. An anti-skid control system according to claim 15, wherein said anti-skid control performing means selects a wheel with the lowest slip ratio.

24. An anti-skid control system according to claim 15, wherein said anti-skid control performing means selects a wheel in which a pressure increasing valve opening time period is the shortest.

25. The anti-skid control system of claim 15, wherein the anti-skid control performing means actuates said pressure increasing valve when a pressure maintaining output signal is generated is generated during said first predetermined time period.

* * * * *